US012593314B2

(12) United States Patent
    Ko et al.

(10) Patent No.: US 12,593,314 B2
(45) Date of Patent: Mar. 31, 2026

(54) METHOD FOR TRANSMITTING AND RECEIVING DATA IN WIRELESS COMMUNICATION SYSTEM, AND WIRELESS COMMUNICATION TERMINAL

(71) Applicant: WILUS INSTITUTE OF STANDARDS AND TECHNOLOGY INC., Gyeonggi-do (KR)

(72) Inventors: Geonjung Ko, Gyeonggi-do (KR); Juhyung Son, Gyeonggi-do (KR); Sanghyun Kim, Seoul (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 352 days.

(21) Appl. No.: 17/923,573

(22) PCT Filed: May 6, 2021

(86) PCT No.: PCT/KR2021/005689
    § 371 (c)(1),
    (2) Date: Nov. 4, 2022

(87) PCT Pub. No.: WO2021/225388
    PCT Pub. Date: Nov. 11, 2021

(65) Prior Publication Data
    US 2023/0354273 A1      Nov. 2, 2023

(30) Foreign Application Priority Data
    May 6, 2020     (KR) ........................ 10-2020-0053630

(51) Int. Cl.
    *H04W 72/04*       (2023.01)
    *H04L 1/00*        (2006.01)

(52) U.S. Cl.
    CPC .......... *H04W 72/04* (2013.01); *H04L 1/0061* (2013.01)

(58) Field of Classification Search
    CPC ............................. H04W 72/04; H04L 1/0061
    See application file for complete search history.

(56) References Cited

U.S. PATENT DOCUMENTS

2016/0353323 A1* 12/2016 Sun ................... H04W 72/0453
2017/0041929 A1    2/2017 Noh et al.
                        (Continued)

FOREIGN PATENT DOCUMENTS

CN      1075251472 A    10/2017
CN      110351063 A     10/2019
                        (Continued)

OTHER PUBLICATIONS

Office Action dated Feb. 13, 2023 for Indian Patent Application No. 202227064018.
                        (Continued)

*Primary Examiner* — Joseph E Avellino
*Assistant Examiner* — Maryam Emadi
(74) *Attorney, Agent, or Firm* — EIP US LLP

(57)                   ABSTRACT

Disclosed is a method for receiving a physical layer protocol data unit (PPDU) in a wireless communication system. A terminal receives, from an access point (AP), an extremely high throughput (EHT) PPDU comprising at least one EHT-signal (SIG) content channel. Each of the at least one EHT-SIG content channel comprises a user-specific field and a common field comprising at least one first resource unit (RU) allocation subfield. An STA then identifies whether the common field further comprises at least one second RU allocation subfield, and can decode the PPDU on the basis of whether the common field further comprises the at least one second RU allocation subfield.

12 Claims, 25 Drawing Sheets

(56) References Cited

U.S. PATENT DOCUMENTS

| | | | | |
|---|---|---|---|---|
| 2019/0289604 A1* | 9/2019 | Gan | ...................... | H04W 72/23 |
| 2019/0334590 A1 | 10/2019 | Son et al. | | |
| 2020/0112408 A1 | 4/2020 | Verma et al. | | |
| 2022/0095347 A1* | 3/2022 | Huang | ................ | H04W 74/006 |
| 2022/0353029 A1* | 11/2022 | Hu | ........................ | H04L 5/0007 |

FOREIGN PATENT DOCUMENTS

| | | |
|---|---|---|
| CN | 107925470 | 3/2021 |
| CN | 110140374 | 5/2021 |
| WO | 2019/240441 | 12/2019 |
| WO | 2020080786 A1 | 4/2020 |

OTHER PUBLICATIONS

Yu, Ross Jian et al.: "Further discussion on RU allocation subfield in EHT-SIG", IEEE 802.11-20/0609r1, Huawei Technologies, Apr. 16, 2020, slides 1-24.

International Preliminary Report on Patentability (Chapter I) for PCT/KR2021/005689 issued on Nov. 8, 2022 and its English translation from WIPO.

Extended European Search Report dated Oct. 2, 2023 for European Patent Application No. 21800587.4.

802 11 Working Group of the LAN/MAN Standards Committee of the IEEE Computer Society: "IEEE P802.11be ™M/D0.4 Draft Standard for Information technology—Tele-communications and information exchange between systems Local and metropolitan area networks—Specific requirements Part 11: Wireless LAN Medium Access Control (MAC) and Physical Layer (PHY) Specifications Amendment 8: Enhancements for extremely high throughput (EHT)", Piscataway, NJ USA, vol. 802.11be drafts, No. D0.4 19 Mar. 19, 2021, pp. 1-605, XP068192110. Retrieved from the Internet : URL:https://grouper.ieee.org/groups/802/11/private/Draft Standards/11be/Draft%20P802.11be_D0. 4_redline_compared_to_D0.3.PDF [retrieved on Mar. 19, 2021] * p. 370; figures 36-44, 36-45, 36-46, 36-47 *.

Office Action dated Nov. 20, 2023 for Japanese Patent Application No. 2022-567661 and its English translation provided by Applicant's foreign counsel.

International Search Report for PCT/KR2021/005689 mailed on Aug. 31, 2021 and its English translation from WIPO.

Written Opinion of the International Searching Authority for PCT/KR2021/005689 mailed on Aug. 31, 2021 and its English translation by Google Translate.

Lim, Dongguk et al., Consideration for EHT-SIG transmission. LG Electronics. IEEE 802.11-20/0020r0. Apr. 9, 2020.

Yu, Ross Jian et al. Further discussion on RU allocation subfield in EHT-SIG. Huawei. IEEE 802.11-20/0609r0. Apr. 22, 2020.

Liu, Jianhan et al. On RU Allocation Singling in EHT-SIG. Mediatek. IEEE 802.11-19/0578r0. Apr. 6, 2020.

Cao, Rui et al. Discussions on U-SIG Content and EHT-SIG Format. NXP. IEEE 802.11-20/0087r0. Jan. 13, 2020.

Office Action dated Sep. 11, 2024 for Vietnamese Patent Application No. 1-2022-07854 and its English translation provided by the Applicant's foreign counsel.

Office Action (1st) dated Mar. 25, 2025 for Chinese Patent Application No. 202180033237.8 and its English translation provided by Applicant's foreign counsel.

Pre-Appeal Examiantion Report dated Jan. 28, 2025 for Japanese Patent Application No. 2022-567661 and its English translation provided by Applicant's foreign counsel.

Lei Huang (Panasonic) et al.: "Discussion on EHT PPDU Formats", doc.: IEEE 802.11-20/0031r0, Jan. 2020, pp. 1-12.

Hearing Notice dated Mar. 7, 2025 for Indian Patent Application No. 202227064018.

Office Action (2nd) dated Jan. 15, 2025 for European Patent Application No. 21 800 587.4.

Office Action dated Jun. 3, 2024 for Japanese Patent Application No. 2022-567661 and its English translation provided by the Applicant's foreign counsel.

Office Action dated Jul. 18, 2024 for European Patent Application No. 21 800 587.4.

Office Action (2nd) dated Jul. 1, 2025 for Japanese Patent Application No. 2022-567661 and its English translation provided by Applicant's foreign counsel.

Office Action (3rd) dated Jul. 16, 2025 for European Patent Application No. 21 800 587.4.

Office Action (1st) dated Jul. 22, 2025 for Japanese Patent Application No. 2024-174326 and its English translation provided by Applicant's foreign counsel.

Japanese Office Action issued in 2024-174326 on Dec. 16, 2025, 7 pgs.

Chinese Notice of Allowance issued in Application No. 202180033237.8, dated Jan. 14, 2026, 6 pages.

European Office Action issued in Application No. 21800587.4, dated Jan. 19, 2026, 8 pgs.

* cited by examiner

Communication Unit

Processor

Memory

Figure 8:
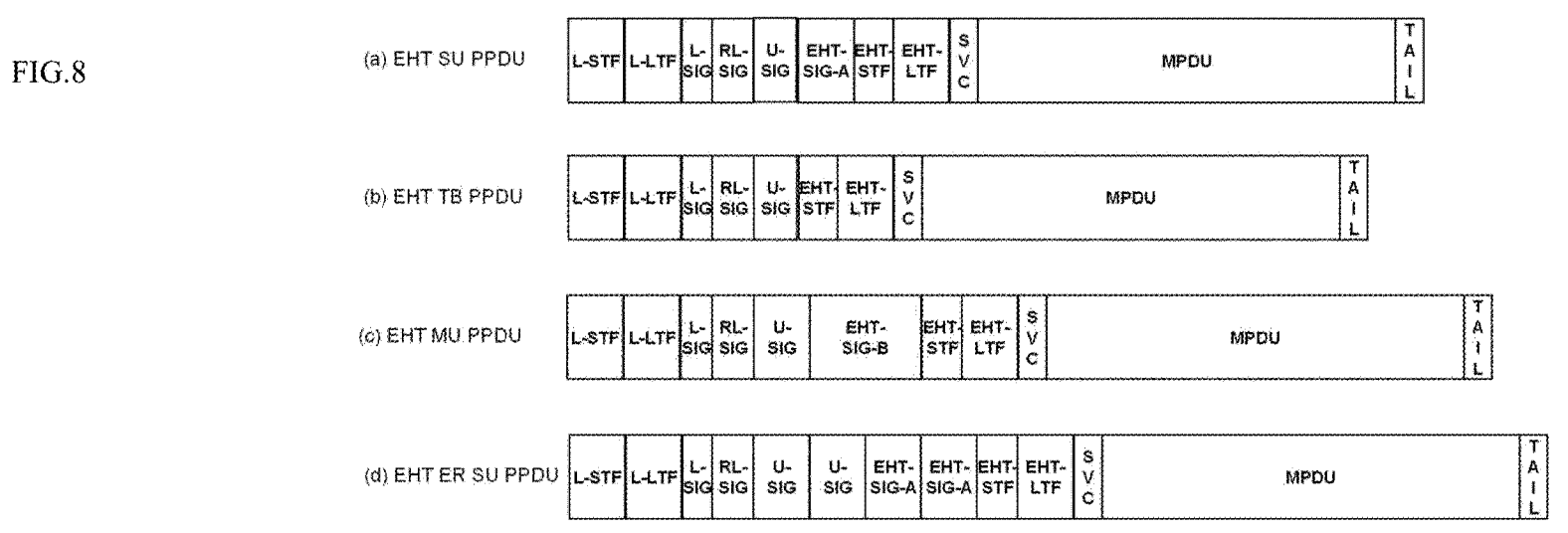

(a) EHT SU PPDU

| L-STF | L-LTF | L-SIG | RL-SIG | U-SIG | EHT-SIG-A | EHT-STF | EHT-LTF | SVC | MPDU | TAIL |

(b) EHT TB PPDU

| L-STF | L-LTF | L-SIG | RL-SIG | U-SIG | EHT-STF | EHT-LTF | SVC | MPDU | TAIL |

(c) EHT MU PPDU

| L-STF | L-LTF | L-SIG | RL-SIG | U-SIG | EHT-SIG-B | EHT-STF | EHT-LTF | SVC | MPDU | TAIL |

(d) EHT ER SU PPDU

| L-STF | L-LTF | L-SIG | RL-SIG | U-SIG | EHT-SIG-A | EHT-STF | EHT-LTF | SVC | MPDU | TAIL |

FIG.10

| | STF | LTF | L-SIG | RL-SIG | U-SIG | EHT-SIG 4, CC2 | ... |
|---|---|---|---|---|---|---|---|
| 80 MHz sub-band 4 | STF | LTF | L-SIG | RL-SIG | U-SIG | EHT-SIG 4, CC1 | ... |
| | STF | LTF | L-SIG | RL-SIG | U-SIG | EHT-SIG 4, CC2 | ... |
| | STF | LTF | L-SIG | RL-SIG | U-SIG | EHT-SIG 4, CC1 | ... |
| | STF | LTF | L-SIG | RL-SIG | U-SIG | EHT-SIG 3, CC2 | ... |
| 80 MHz sub-band 3 | STF | LTF | L-SIG | RL-SIG | U-SIG | EHT-SIG 3, CC1 | ... |
| | STF | LTF | L-SIG | RL-SIG | U-SIG | EHT-SIG 3, CC2 | ... |
| | STF | LTF | L-SIG | RL-SIG | U-SIG | EHT-SIG 3, CC1 | ... |
| | STF | LTF | L-SIG | RL-SIG | U-SIG | EHT-SIG 2, CC2 | ... |
| 80 MHz sub-band 2 | STF | LTF | L-SIG | RL-SIG | U-SIG | EHT-SIG 2, CC1 | ... |
| | STF | LTF | L-SIG | RL-SIG | U-SIG | EHT-SIG 2, CC2 | ... |
| | STF | LTF | L-SIG | RL-SIG | U-SIG | EHT-SIG 2, CC1 | ... |
| | STF | LTF | L-SIG | RL-SIG | U-SIG | EHT-SIG 1, CC2 | ... |
| 80 MHz sub-band 1 | STF | LTF | L-SIG | RL-SIG | U-SIG | EHT-SIG 1, CC1 | ... |
| | STF | LTF | L-SIG | RL-SIG | U-SIG | EHT-SIG 1, CC2 | ... |
| | STF | LTF | L-SIG | RL-SIG | U-SIG | EHT-SIG 1, CC1 | ... |

FIG.12A

| B9 | B8B7....B1B0 | #1 | #2 | #3 | #4 | #5 | #6 | #7 | #8 | #9 | # of Entries |
|---|---|---|---|---|---|---|---|---|---|---|---|
| 0 | 0 ("000000000") | 26 | 26 | 26 | 26 | 26 | 26 | 26 | 26 | 26 | 1 |
| 0 | 1 ("000000001") | 26 | 26 | 26 | 26 | 26 | 26 | 26 | 52 | | 1 |
| 0 | 2("000000010") | 26 | 26 | 26 | 26 | 26 | 52 | | 26 | 26 | 1 |
| 0 | 3 ("000000011") | 26 | 26 | 26 | 26 | 26 | 52 | | 52 | | 1 |
| 0 | 4 ("000000100") | 26 | 26 | 52 | | 26 | 26 | 26 | 26 | 26 | 1 |
| 0 | 5 ("000000101") | 26 | 26 | 52 | | 26 | 26 | 26 | 52 | | 1 |
| 0 | 6 ("000000110") | 26 | 26 | 52 | | 26 | 52 | | 26 | 26 | 1 |
| 0 | 7 ("000000111") | 26 | 26 | 52 | | 26 | 52 | | 52 | | 1 |
| 0 | 8 ("000001000") | 52 | | 26 | 26 | 26 | 26 | 26 | 26 | 26 | 1 |
| 0 | 9 ("000001001") | 52 | | 26 | 26 | 26 | 26 | 26 | 52 | | 1 |
| 0 | 10 ("000001010") | 52 | | 26 | 26 | 26 | 52 | | 26 | 26 | 1 |
| 0 | 11 ("000001011") | 52 | | 26 | 26 | 26 | 52 | | 52 | | 1 |
| 0 | 12 ("000001100") | 52 | | 52 | | 26 | 26 | 26 | 26 | 26 | 1 |
| 0 | 13 ("000001101") | 52 | | 52 | | 26 | 26 | 26 | 52 | | 1 |
| 0 | 14 ("000001110") | 52 | | 52 | | 26 | 52 | | 26 | 26 | 1 |
| 0 | 15 ("000001111") | 52 | | 52 | | 26 | 52 | | 52 | | 1 |
| 0 | 16~23 ("00010y2y1y0") | 52 | | 52 | | / | 106 | | | | 8 |
| 0 | 24~31 ("00011y2y1y0") | 106 | | | | / | 52 | | 52 | | 8 |
| 0 | 32~39 ("000100y2y1y0") | 26 | 26 | 26 | 26 | 26 | 106 | | | | 8 |
| 0 | 40~47 ("000101y2y1y0") | 26 | 26 | 52 | | 26 | 106 | | | | 8 |
| 0 | 48~55 ("000110y2y1y0") | 52 | | 26 | 26 | 26 | 106 | | | | 8 |
| 0 | 56~63 ("000111y2y1y0") | 52 | | 52 | | 26 | 106 | | | | 8 |
| 0 | 64~71 ("001000y2y1y0") | 106 | | | | 26 | 26 | 26 | 26 | 26 | 8 |
| 0 | 72~79 ("001001y2y1y0") | 106 | | | | 26 | 26 | 26 | 52 | | 8 |
| 0 | 80~87 ("001010y2y1y0") | 106 | | | | 26 | 26 | 26 | 52 | 26 | 8 |
| 0 | 88~95 ("001011y2y1y0") | 106 | | | | 26 | 52 | | 52 | | 8 |
| 0 | 96~111 ("001100y1y0z1z0") | 106 | | | | / | 106 | | | | 16 |
| 0 | 112 ("001110000") | 52 | | 52 | | / | 52 | | 52 | | 1 |

FIG.12B

| B9 | B8B7....B1B0 | #1 | #2 | #3 | #4 | #5 | #6 | #7 | #8 | #9 | # of Entries |
|---|---|---|---|---|---|---|---|---|---|---|---|
| 0 | 113~127 ("001110001"~"001111111") | reserved | | | | | | | | | 15 |
| 0 | 128~191 ("010y2y1y0z2z1z0") | 106 | | | | 26 | 106 | | | | 64 |
| 0 | 192~255 ("011000000"~"011111111") | reserved | | | | | | | | | 64 |
| 0 | 256 ("100000000") | 26 | 78 | | 26 | 26 | 26 | 26 | 26 | | 1 |
| 0 | 257 ("100000001") | 26 | 78 | | 26 | 26 | 26 | 52 | | | 1 |
| 0 | 258 ("100000010") | 26 | 78 | | 26 | 52 | | 26 | 26 | | 1 |
| 0 | 259 ("100000011") | 26 | 78 | | 26 | 52 | | 52 | | | 1 |
| 0 | 260 ("100000100") | 26 | 26 | 26 | 26 | 26 | 78 | | 26 | | 1 |
| 0 | 261 ("100000101") | 52 | | 26 | 26 | 26 | 78 | | 26 | | 1 |
| 0 | 262 ("100000110") | 26 | 26 | 52 | | 26 | 78 | | 26 | | 1 |
| 0 | 263 ("100000111") | 52 | | 52 | | 26 | 78 | | 26 | | 1 |
| 0 | 264 ("100001000") | 26 | 78 | | 26 | 78 | | | 26 | | 1 |
| 0 | 265~287 ("100001001"~"100011111") | reserved | | | | | | | | | 22 |
| 0 | 288~295 ("10010y2y1y0") | 26 | 78 | | 26 | 106 | | | | | 8 |
| 0 | 296~303 ("100101y2y1y0") | 106 | | | 26 | 78 | | | 26 | | 8 |
| 0 | 304~311 ("100110y2y1y0") | 132 | | | | 26 | 26 | 26 | 26 | | 8 |
| 0 | 312~319 ("100111y2y1y0") | 132 | | | | 26 | 26 | 52 | | | 8 |
| 0 | 320~327 ("101000y2y1y0") | 132 | | | | 52 | | 26 | 26 | | 8 |
| 0 | 328~335 ("101001y2y1y0") | 132 | | | | 52 | | 52 | | | 8 |
| 0 | 336~343 ("101010y2y1y0") | 26 | 26 | 26 | 26 | 132 | | | | | 8 |
| 0 | 344~351 ("101011y2y1y0") | 52 | | 26 | 26 | 132 | | | | | 8 |
| 0 | 352~359 ("101100y2y1y0") | 26 | 26 | 52 | | 132 | | | | | 8 |
| 0 | 360~367 ("101101y2y1y0") | 52 | | 52 | | 132 | | | | | 8 |
| 0 | 368~375 ("101110y2y1y0") | 26 | 78 | | | 132 | | | | | 8 |
| 0 | 376~383 ("101111y2y1y0") | 132 | | | | 78 | | | 26 | | 8 |
| 0 | 384~447 ("110y2y1y0z2z1z0") | 132 | | | | 106 | | | | | 64 |
| 0 | 448~511 ("111y2y1y0z2z1z0") | 106 | | | | 132 | | | | | 64 |

FIG.13A

| B9 | B8B7....B1B0 | #1 | #2 | #3 | #4 | #5 | #6 | #7 | #8 | #9 | #10 | #11 | #12 | #13 | #14 | #15 | #16 | Number of Entries |
|---|---|---|---|---|---|---|---|---|---|---|---|---|---|---|---|---|---|---|
| 1 | "00000y3y2y1y0" | 242 | | | | | | | | | | | | | | | | up to 16 |
| 1 | "00001y3y2y1y0" | 484 | | | | | | | | | | | | | | | | up to 16 |
| 1 | "00010y3y2y1y0" | 996 | | | | | | | | | | | | | | | | up to 16 |
| 1 | "00011y3y2y1y0" | 2x996 | | | | | | | | | | | | | | | | up to 16 |
| 1 | "00100y3y2y1y0" | | 242 | 484 | | | | | | | | | | | | | | up to 16 |
| 1 | "00101y3y2y1y0" | 242 | | 484 | | | | | | | | | | | | | | up to 16 |
| 1 | "00110y3y2y1y0" | 484 | | 242 | | | | | | | | | | | | | | up to 16 |
| 1 | "00111y3y2y1y0" | 484 | 242 | | | | | | | | | | | | | | | up to 16 |
| 1 | "01000y3y2y1y0" | | | 484 | | 996 | | | | | | | | | | | | up to 16 |
| 1 | "01001y3y2y1y0" | 484 | | | | 996 | | | | | | | | | | | | up to 16 |
| 1 | "01010y3y2y1y0" | | 996 | | | | 484 | | | | | | | | | | | up to 16 |
| 1 | "01011y3y2y1y0" | | 996 | | | 484 | | | | | | | | | | | | up to 16 |
| 1 | "01100y3y2y1y0" | | | 484 | | 996 | | | | | 996 | | | | | | | up to 16 |
| 1 | "01101y3y2y1y0" | 484 | | | | 996 | | | | | 996 | | | | | | | up to 16 |
| 1 | "01110y3y2y1y0" | | 996 | | | | 484 | | | | 996 | | | | | | | up to 16 |
| 1 | "01111y3y2y1y0" | | 996 | | | 484 | | | | | 996 | | | | | | | up to 16 |
| 1 | "10000y3y2y1y0" | | 996 | | | | 996 | | | | | | 484 | | | | | up to 16 |
| 1 | "10001y3y2y1y0" | | 996 | | | | 996 | | | 484 | | | | | | | | up to 16 |
| 1 | "10010y3y2y1y0" | | 996 | | | | 996 | | | | | 996 | | | | | | up to 16 |
| 1 | "10011y3y2y1y0" | | 996 | | | | 996 | | | | | | | | 996 | | | up to 16 |
| 1 | "10100y3y2y1y0" | | 996 | | | | | | | | 996 | | | | 996 | | | up to 16 |
| 1 | "10101y3y2y1y0" | | | | | 996 | | | | | 996 | | | | 996 | | | up to 16 |
| 1 | "101100000" | | 242 | 484 | | 996 | | | | | | | | | | | | 1 |
| 1 | "101100001" | 242 | | 484 | | 996 | | | | | | | | | | | | 1 |

FIG.13B

| B9 | B8B7... B1B0 | #1 | #2 | #3 | #4 | #5 | #6 | #7 | #8 | #9 | #10 | #11 | #12 | #13 | #14 | #15 | #16 | Number of Entries |
|---|---|---|---|---|---|---|---|---|---|---|---|---|---|---|---|---|---|---|
| 1 | "101100010" | 484 | | 242 | | 996 | | | | | | | | | | | | 1 |
| 1 | "101100011" | 484 | 242 | | | 996 | | | | | | | | | | | | 1 |
| 1 | "101100100" | 996 | | | | | 242 | 484 | | | | | | | | | | 1 |
| 1 | "101100101" | 996 | | | 242 | | 484 | | | | | | | | | | | 1 |
| 1 | "101100110" | 996 | | | 484 | | | 242 | | | | | | | | | | 1 |
| 1 | "101100111" | 996 | | | 484 | 242 | | | | | | | | | | | | 1 |
| 1 | "101101000" | | | | | 996 | | | 996 | | | | | | | | | 1 |
| 1 | "101101001" | 996 | | | | | | 996 | | | | | | | | | | 1 |
| 1 | "101101010" | 242 (for empty RU with zero user) | | | | | | | | | | | | | | | | 1 |
| 1 | "101101011" | 484 (for empty RU with zero user) | | | | | | | | | | | | | | | | 1 |
| 1 | "101101100" | 996 (for empty RU with zero user) | | | | | | | | | | | | | | | | 1 |
| 1 | "101101101"--"10 111111" | reserved | | | | | | | | | | | | | | | | 19 |
| 1 | "11000y3y2y1y0" | 996 | | | 996 | | | | 996 | | | 484 | | | | | | up to 16 |
| 1 | "11001y3y2y1y0" | 996 | | | 996 | | | | 996 | | | | 484 | | | | | up to 16 |
| 1 | "11010y3y2y1y0" | 996 | | | 996 | | | 484 | | | | 996 | | | | | | up to 16 |
| 1 | "11011y3y2y1y0" | 996 | | | 996 | | | | 484 | | | 996 | | | | | | up to 16 |
| 1 | "11100y3y2y1y0" | 996 | | 484 | | | | | 996 | | | 996 | | | | | | up to 16 |
| 1 | "11101y3y2y1y0" | 996 | | | | 484 | | | 996 | | | 996 | | | | | | up to 16 |
| 1 | "11110y3y2y1y0" | 484 | | | | 996 | | | 996 | | | 996 | | | | | | up to 16 |
| 1 | "11111y3y2y1y0" | | | 484 | | 996 | | | 996 | | | 996 | | | | | | up to 16 |

| Content channel 1 | Location Indicator | RU Allocation | CRC | Tail |
|---|---|---|---|---|
| Bits: | 4 | variable (N_RA or 2*N_RA) | 4 | 6 |

| Content channel 2 | Location Indicator | RU Allocation | CRC | Tail |
|---|---|---|---|---|
| Bits: | 4 | variable (N_RA or 2*N_RA) | 4 | 6 |

(b)

| Content channel 1 | More RU Allocation | RU Allocation | CRC | Tail |
|---|---|---|---|---|
| Bits: | 1 | variable (N_RA or 2*N_RA) | 4 | 6 |

| Content channel 2 | More RU Allocation | RU Allocation | CRC | Tail |
|---|---|---|---|---|
| Bits: | 1 | variable (N_RA or 2*N_RA) | 4 | 6 |

(c)

| Content channel 1 | RU Allocation | RU Allocation | CRC | Tail |
|---|---|---|---|---|
| Bits: | N_RA | N_RA | 4 | 6 |

| Content channel 2 | RU Allocation | RU Allocation | CRC | Tail |
|---|---|---|---|---|
| Bits: | N_RA | N_RA | 4 | 6 |

| | Location Indicator | RU Allocation | Center 26-tone RU | CRC | Tail |
|---|---|---|---|---|---|

Content channel 2

| | Location Indicator | | RU Allocation | Center 26-tone RU | CRC | Tail |
|---|---|---|---|---|---|---|

Content channel 1

Dummy RU Allocation

Indicates Dummy RU Allocation subfield

FIG.23

METHOD FOR TRANSMITTING AND RECEIVING DATA IN WIRELESS COMMUNICATION SYSTEM, AND WIRELESS COMMUNICATION TERMINAL

CROSS-REFERENCE TO RELATED APPLICATIONS

This application is the national stage of International Patent Application No. PCT/KR2021/005689 filed on May 6, 2021, which claims priority to Korean Patent Application No. 10-2020-0053630 filed in the Korean Intellectual Property Office on May 6, 2020, the disclosures of which are incorporated by reference herein in their entireties.

TECHNICAL FIELD

The disclosure relates to a wireless communication system and, more specifically, to a wireless communication method and a wireless communication terminal for efficiently signaling extremely high throughput signaling field information in a wireless communication system.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An aspect of the present invention is to provide a high-speed wireless LAN service for a new multimedia application, as described above.

In addition, the disclosure is to provide a method and a device for transmitting information for reception of PPDU.

In addition, the disclosure is to provide a method for individually encoding/decoding resource unit (RU) allocation subfields indicating resource units through which a PPDU is transmitted.

Technical tasks to be achieved in the specification are not limited to the technical tasks mentioned above, and other technical tasks that are not mentioned may be clearly understood by those skilled in the art on the basis of the following descriptions.

Solution to Problem

A terminal for transmitting a trigger-based physical layer protocol data unit (PPDU) corresponding to a response frame on the basis of a trigger frame in a wireless communication system includes: a communication module; and a processor configured to control the communication module, wherein the processor is configured to: receive an extremely high throughput physical layer protocol data unit (EHT PPDU) including one or more EHT-signal (SIG) content channels from an access point (AP), each of the one or more EHT-SIG content channels including a user specific field and a common field including at least one first resource unit (RU) allocation subfield; identify whether the common field further includes at least one second RU allocation subfield; and decode the PPDU on the basis of whether the common field further includes the at least one second RU allocation subfield.

In addition, in the disclosure, when the common field further includes the at least one second RU allocation subfield, each of the at least one first RU allocation subfield and the at least one second RU allocation subfield is individually decoded.

In addition, in the disclosure, when the common field further includes the at least one second RU allocation subfield, each of the one or more EHT-SIG content channels further includes a first cyclic redundancy check (CRC) and a first tail related to the at least one first RU allocation subfield, when the common field further includes the at least one second RU allocation subfield, the first CRC and the first tail are positioned before the at least one second RU allocation subfield, and each of the one or more EHT-SIG content channels further includes a second CRC and a second tail related to the at least one second RU allocation subfield.

In addition, in the disclosure, whether each of the one or more EHT-SIG content channels further includes the at least one second RU allocation subfield is identified on the basis of a specific subfield positioned before the at least one first RU allocation subfield.

In addition, in the disclosure, a specific subfield, the at least one first RU allocation subfield, the first CRC, and the first tail constitute a first encoding block, and the at least one second RU allocation subfield, the second CRC, the second tail constitute a second encoding block In addition, in the disclosure, each of the first encoding block and the second encoding block is individually decoded.

In addition, in the disclosure, the one or more EHT-SIG content channels are transmitted at each predetermined bandwidth according to a bandwidth of the PPDU, and the specific subfield is configured as the same value for each of the one or more EHT-SIG content channels.

In addition, in the disclosure, the specific subfield is used to identify a total number of each of the at least one first RU allocation subfield and the at least one second RU allocation subfield.

In addition, the disclosure provides a method including: receiving an extremely high throughput physical layer protocol data unit (EHT PPDU) including one or more EHT-signal (SIG) content channels from an access point (AP), wherein each of the one or more EHT-SIG content channels includes a user specific field and a common field including at least one first resource unit (RU) allocation subfield; identifying whether the common field further includes at least one second RU allocation subfield; and decoding the PPDU on the basis of whether the common field further includes the at least one second RU allocation subfield.

Advantageous Effects of Invention

According to an embodiment of the disclosure, extremely high throughput signaling field information can be efficiently signaled.

In addition, according to an embodiment of the disclosure, in a contention-based channel access system, a total resource use rate can be increased, and the performance of a wireless LAN system can be enhanced.

In addition, according to an embodiment of the disclosure, a PPDU can be received and decoded on the basis of information for transmission and reception of a PPDU, the information being included in the PPDU.

In addition, according to an embodiment of the disclosure, RU allocation subfields indicating RUs for PPDU transmission are individually encoded/decoded, and thus a PPDU packet structure can be efficiently configured.

The effects obtainable in the present invention are not limited to the above-mentioned effects, and other effects that are not mentioned may be clearly understood by those skilled in the art to which the present invention belongs, from descriptions below.

BRIEF DESCRIPTION OF DRAWINGS

FIG. 2 illustrates a wireless LAN system according to another embodiment of the present invention.

FIG. 3 illustrates a configuration of a station according to an embodiment of the present invention.

FIG. 4 illustrates a configuration of an access point according to an embodiment of the present invention.

FIG. 8 illustrates an example of various extremely high throughput (EHT) physical protocol data unit (PPDU) formats and a method for indicating the same according to an embodiment of the disclosure.

FIG. 10 illustrates a structure of a preamble according to an embodiment of the disclosure.

FIGS. 12A and 12B illustrate an example of an RU allocation subfield according to an embodiment of the disclosure.

FIGS. 13A and 13B illustrate another example of an RU allocation subfield according to an embodiment of the disclosure.

FIG. 17 illustrates an EHT-SIG structure of an 80 MHz PPDU according to an embodiment of the disclosure.

FIG. 19 illustrates another example of center 26-tone RU signaling according to an embodiment of the disclosure.

FIG. 21 illustrates another example of an EHT-SIG structure according to an embodiment of the disclosure.

FIG. 23 is a flowchart illustrating an example of method for generating and transmitting a PPDU according to an embodiment of the disclosure.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
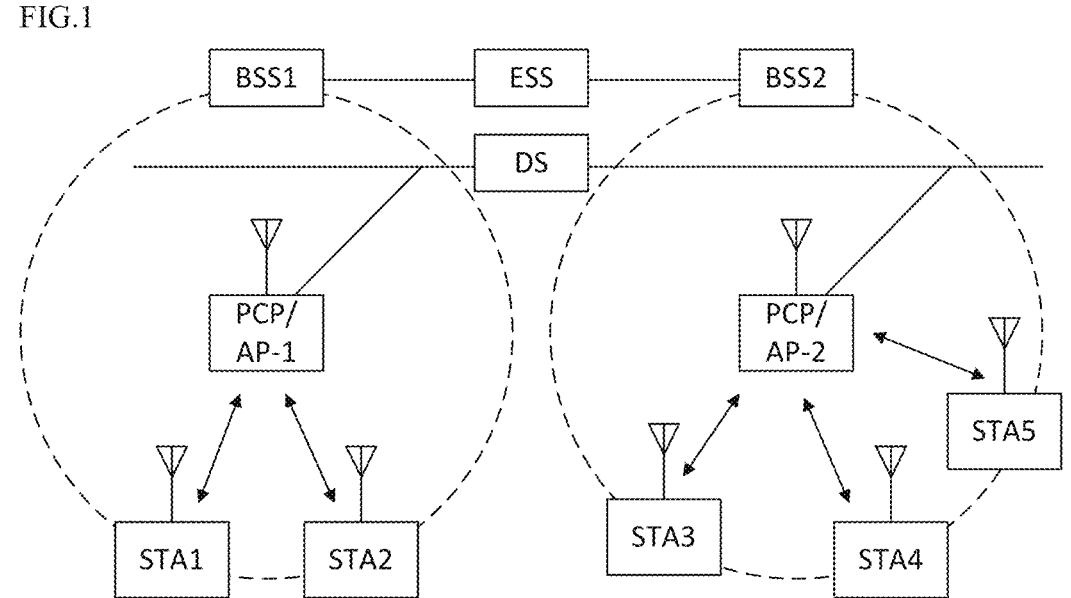
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
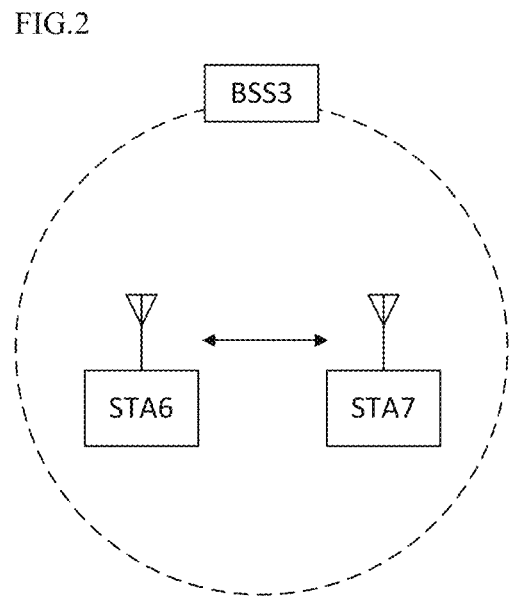

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
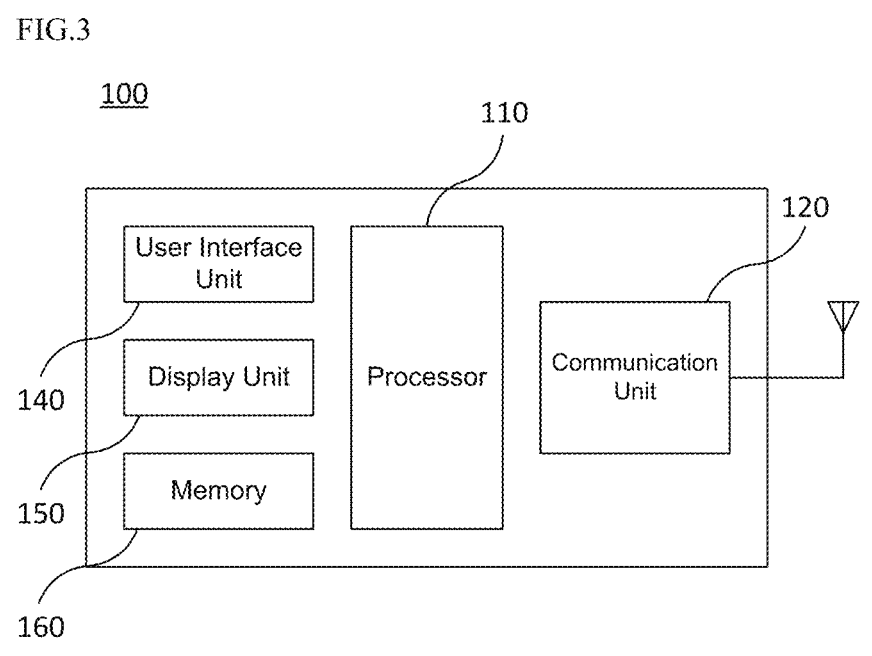

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
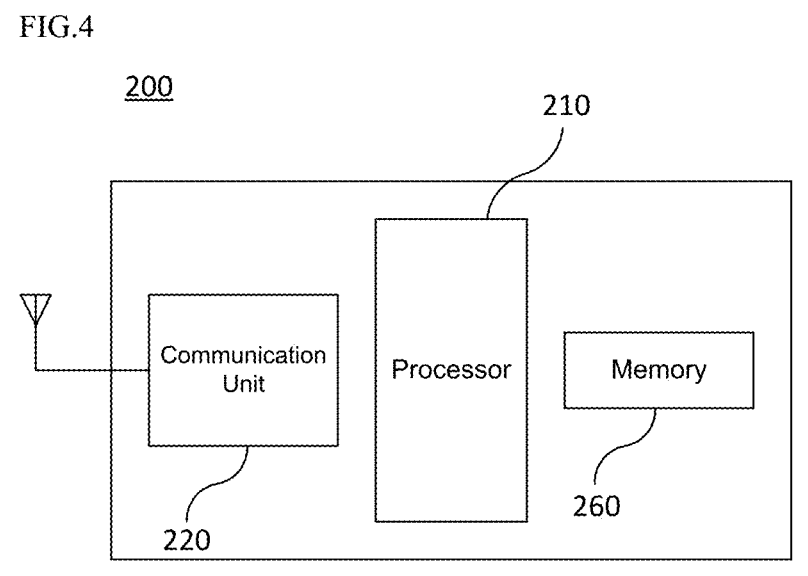

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
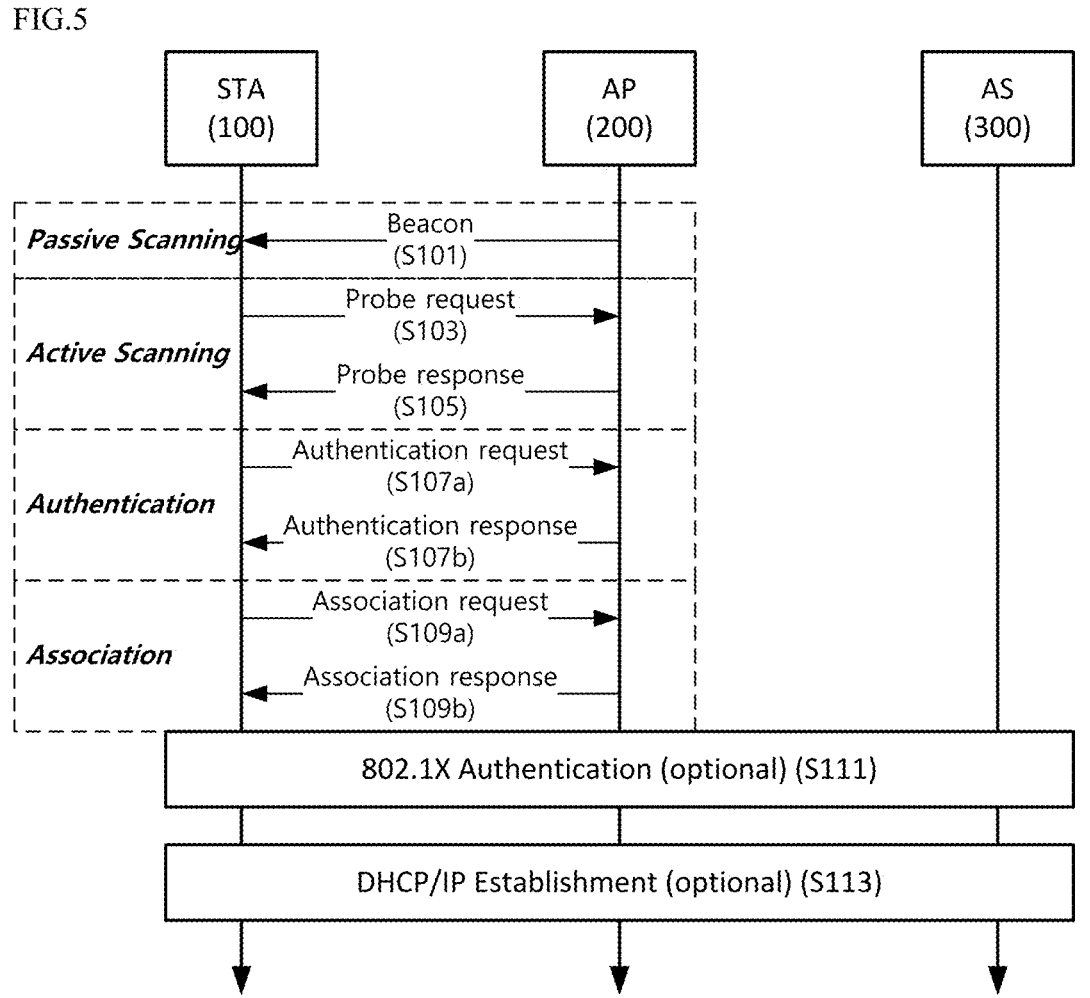
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
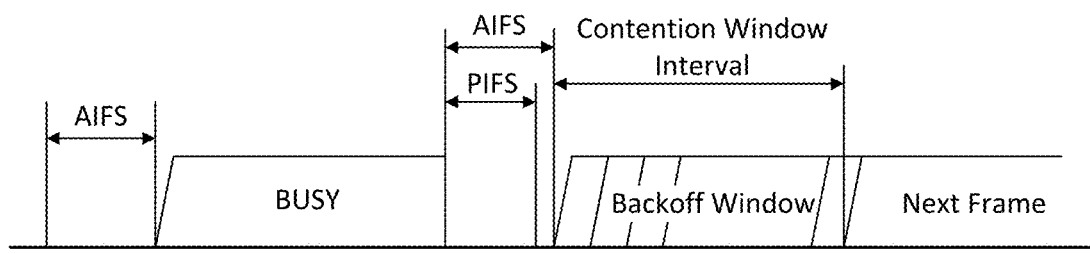
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Examples of Various PPDU Formats

Figure 7:
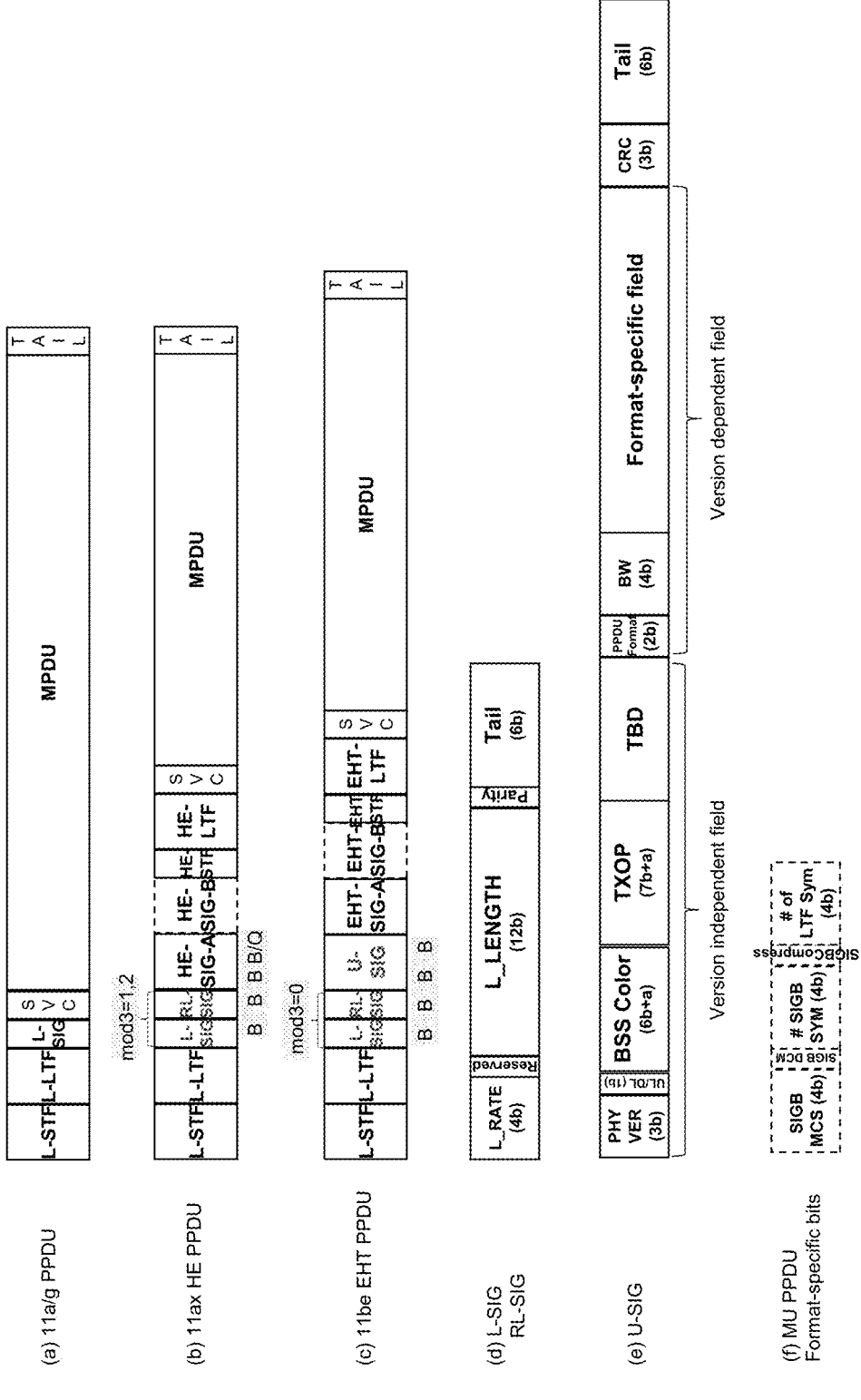
FIG. 7 illustrates an example of a format of a protocol data unit (PPDU) for each of various standard generations.

FIG. 7 illustrates an example of a format of a protocol data unit (PPDU) for each of various standard generations. More specifically, part (a) of FIG. 7 illustrates an embodiment of a legacy PPDU format based on 802.11a/g, part (b) of FIG. 7 illustrates an embodiment of a HE PPDU format based on 802.11ax, and part (c) of FIG. 7 illustrates an embodiment of a non-legacy PPDU (i.e., EHT PPDU) format based on 802.11be. In addition, part (d) of FIG. 7 illustrates detailed field configurations of an L-SIG and an RL-SIG commonly used in the PPDU formats.

Referring to part (a) of FIG. 7, a preamble of a legacy PPDU includes a legacy short training field (L-STF), a legacy long training field (L-LTF), and a legacy signal field (L-SIG). In an embodiment of the disclosure, the L-STF, L-LTF, and L-SIG may be referred to as legacy preambles.

Referring to part (b) of FIG. 7, a preamble of a HE PPDU further includes, to the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the disclosure, the RL-SIG, HE-SIG-A, HE-SIG-B, HE-STF, and HE-LTF may be referred to as HE preambles. A detailed configuration of a HE preamble may change according to a HE PPDU format. For example, the HE-SIG-B may be used only in a HE MU PPDU format.

Referring to part (c) of FIG. 7, a preamble of an EHT PPDU further includes, to the legacy preamble, a repeated legacy short training field (RL-SIG), a universal signal field (U-SIG), an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the disclosure, the RL-SIG, EHT-SIG-A, EHT-SIG-B, EHT-STF, and EHT-LTF may be referred to as EHT preambles. A detailed configuration of a non-legacy preamble may change according to an EHT PPDU format. For example, the EHT-SIG-A and the EHT-SIG-B may be used only in some of EHT PPDU formats.

The L-SIG field included in the preamble of the PPDU employees 64 FFT OFDM and includes a total of 64 subcarriers. Among these, 48 subcarriers remaining after excluding a guard subcarrier, a DC subcarrier, and a pilot subcarrier are used for L-SIG data transmission. The L-SIG employees a modulation and coding scheme (MCS) of BPSK, rate=1/2, and thus includes information of a total of 24 bits. Part (d) of FIG. 7 illustrates a configuration of 24-bit information of the L-SIG.

Referring to part (d) of FIG. 7, the L-SIG includes an L-RATE field and an L_LENGTH field. The L_RATE field includes four bits and indicates an MCS used for data transmission. Specifically, the L_RATE field indicates a value among transmission rates of 6/9/12/18/24/36/48/54 Mbps obtained through a combination of a modulation scheme such as BPSK/QPSK/16-QAM/64-QAM and a coding rate such as 1/2, 2/3, and 3/4. A total length of a corresponding PPDU may be indicated through a combination of information of the L_RATE field and the L_LENGTH field. In the non-legacy PPDU format, the L_RATE field is configured at 6 Mbps corresponding to the minimum rate.

A unit of the L_LENGTH field is a byte, and a total of 12 bits may be allocated so that a maximum value of 4095 may be signaled, and the length of a corresponding PPDU may be indicated in a combination with the L-RATE field. In this case, a legacy terminal and a non-legacy terminal may interpret the L_LENGTH field in different methods.

First, a method for interpreting the length of a corresponding PPDU by the legacy terminal or the non-legacy terminal by using the L_LENGTH field is as follows. When a value of the L_RATE field is configured to indicate 6 Mbps, three bytes (i.e., 24 bits) may be transmitted for 4 us corresponding to duration of one symbol of 64 FFT. Accordingly, a 64 FFT-based symbol number after the L-SIG is acquired by dividing, by three bytes corresponding to a transmission rate of one symbol, a value acquired by adding three bytes corresponding to an SVC field and a tail field to the L_LENGTH field value. When 20 us required for transmission of the L-STF, L-LTF, and L-SIG is added to a value acquired by multiplying the number of acquired symbols and 4 us corresponding to duration of one symbol, the length of the corresponding PPDU, i.e., a reception time (RX-TIME), is acquired. This is expressed as Equation 1 below.

$$RXTIME(us) = \left( \left\lceil \frac{\text{L\_LENGTH} + 3}{3} \right\rceil \right) \times 4 + 20 \qquad \text{[Equation 1]}$$

In this case, $\lceil x \rceil$ indicates a minimum natural value equal to or greater than x. A maximum value of the L_LENGTH field is 4095, and thus the maximum length of the PPDU may be configured as 5.484 ms. The non-legacy terminal transmitting the corresponding PPDU needs to configure the L_LENGTH field as shown in Equation 2 below.

$$\text{L\_LENGTH(byte)} = \left( \left\lceil \frac{TXTIME - 20}{4} \right\rceil \right) \times 3 - 3 \qquad \text{[Equation 2]}$$

Here, TXTIME is the total transmission time constituting the corresponding PPDU, and is shown in Equation 3 below. In this case, TX indicates a transmission time of X.

$$TXTIME \ (us) = T_{L\text{-}STF} + T_{L\text{-}LTF} + T_{L\text{-}SIG} + T_{RL\text{-}SIG} +$$
$$T_{U\text{-}SIG} + (T_{EHT\text{-}SIG\text{-}A}) + (T_{EHT\text{-}SIG\text{-}B}) + T_{EHT\text{-}STF} +$$
$$N_{EHT\text{-}LTF} \cdot T_{EHT\text{-}LTF} + T_{DATA} \qquad \text{[Equation 3]}$$

Referring to the equations above, the length of a PPDU is calculated on the basis of a value acquired by rounding L_LENGTH/3 up. Accordingly, for a random k value, three different values such as L_LENGTH={3k+1, 3k+2, 3(k+1)} indicate the same PPDU length.

Referring to FIG. 7E, a universal SIG (U-SIG) field continuously exists in an EHT PPDU and a next generation wireless LAN PPDU, and performs a role of distinguishing a generation of a PPDU, including 11be. The U-SIG is a 64 FFT-based OFDM 2 symbol, and may transfer information of a total of 52 bits. Among the 52 bits, 43 bits remaining after excluding CRC/tail nine bits is largely divided into a version independent (VI) field and a version dependent (VD) field.

The VI field continuously maintains a current bit configuration also in the future, so that current 11be terminals may acquire information on a corresponding PPDU through VI fields of the corresponding PPDU even though a next generation PPDU is defined. To this end, the VI field includes PHY version, UL/DL, BSS color, TXOP, and reserved fields. The PHY version field is 3 bits and performs a role of sequentially distinguishing 11be and next generation wireless LAN standards. In a case of 11be, 11be has a value of 000b. The UL/DL field distinguishes whether the PPDU is an uplink/downlink PPDU. The BSS color indicates an identifier for each BSS defined in 11ax, and has a value of 6 bits or more. The TXOP indicates transmission opportunity duration transmitted in a MAC header, wherein, by adding the TXOP to a PHY header, the PPDU may infer the length of the TXOP included therein, without having to decode an MPDU, and the TXOP has a value of 7 bits or more.

The VD field is signaling information useful only for an 11be version of the PPDU, and may include a field commonly used in any PPDU format such as PPDU format and BW, and a field defined differently for each PPDU format. The PPDU format is a classifier that classifies an EHT single user (SU), an EHT multiple user (MU), an EHT trigger-based (TB), an EHT extended range (ER) PPDU, etc. The BW field signals five basic PPDU BW options (a BW which can be expressed in the form of an exponential power of 20*2 may be referred to as a basic BW) of 20, 40, 80, 160 (80+80), and 320 (160+160) MHz and various remaining PPDU BWs configured via preamble puncturing. In addition, after being signaled at 320 MHz, signaling may be performed in a form in which some 80 MHz is punctured. In addition, a punctured and modified channel type may be directly signaled in the BW field, or may be signaled using both the BW field and a field (for example, a field within the EHT-SIG field) appearing after the BW field. If the BW field is configured by 3 bits, a total of eight BW signaling may be performed, and thus only up to three signaling may be performed in a puncturing mode. If the BW field is configured by 4 bits, a total of 16 BW signaling may be performed, and thus up to 11 signaling may be performed in the puncturing mode.

A field positioned after the BW field varies depending on the type and format of the PPDU, an MU PPDU and an SU PPDU may be signaled in the same PPDU format, a field for classification between the MU PPDU and the SU PPDU may be positioned before an EHT-SIG field, and additional signaling may be performed for the same. Both the SU PPDU and the MU PPDU include the EHT-SIG field, but some fields that are not required in the SU PPDU may be compressed. In this case, information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and some fields (for example, an RA field, etc.) may be omitted according to a value of the compressed field.

If a part of the EHT-SIG field of the SU PPDU is compressed, information to be included in the compressed field may be signaled also in an uncompressed field (for example, the common field, etc.). The MU PPDU corresponds to a PPDU format for simultaneous reception by multiple users, and thus the EHT-SIG field needs to be necessarily transmitted after to the U-SIG field, and the amount of signaled information may vary. That is, multiple MU PPDUs are transmitted to multiple STAs, and thus the respective STAs need to recognize positions of RUs, at which the MU PPDUs are transmitted, the STAs to which the RUs have been allocated, respectively, and whether the transmitted MU PPDUs have been transmitted to the STAs themselves. Therefore, an AP needs to transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and position of an RU allocated to each user.

In the case of the SU PPDU, multiple RUs may be allocated to an STA, and the multiple RUs may be continuous or discontinuous. If the RUs allocated to the STA are discontinuous, the STA needs to recognize a punctured RU in the middle in order to efficiently receive the SU PPDU. Accordingly, the AP may transmit the SU PPDU including information (for example, a puncturing pattern of the RUs, etc.) of punctured RUs among the RUs allocated to the STA. That is, in a case of the SU PPDU, a puncturing mode field including information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and the BW of the SU PPDU in combination with a value of the BW field. For example, the SU PPDU is a PPDU transmitted only to a single terminal, and thus the STA may recognize a bandwidth allocated to the STA itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in a resource unit remaining after excluding a specific channel of the punctured resource unit. In this case, the multiple RUs allocated to the STA may be configured by different frequency bands or tones.

Only limited discontinuous channel types are signaled in order to reduce signaling overhead of the SU PPDU. Puncturing may be performed for each 20 MHz sub-channel, and thus if puncturing is performed for a BW having multiple 20 MHz sub-channels such as 80, 160, and 320 MHz, a discontinuous channel (if puncturing of only edge 20 MHz is considered to be discontinuous) type needs to be signaled in the case of 320 MHz by expressing whether each of 15 20 MHz sub-channels remaining after excluding a primary channel is used. As such, allocating 15 bits to signal a discontinuous channel type of single user transmission may cause excessively large signaling overhead in consideration of a low transmission rate of a signaling part.

In addition, an embodiment of the disclosure proposes a technique for differently configuring a PPDU indicated by preamble puncturing BW values according to a PPDU format signaled in a PPDU format field. It is assumed that the length of a BW field is 4 bits, and in a case of an EHT SU PPDU or a TB PPDU, the EHT-SIG-A of 1 symbol may be additionally signaled after the U-SIG, or the EHT-SIG-A may not be signaled at all, and thus in consideration of this, it is necessary to completely signal up to 11 puncturing modes via only the BW field of the U-SIG. However, in a case of an EHT MU PPDU, the EHT-SIG-B is additionally signaled after the U-SIG, and thus up to 11 puncturing modes may be signaled in a method different from that of the SU PPDU. In a case of an EHT ER PPDU, a BW field may be configured by 1 bit to signal whether the EHT ER PPDU is a PPDU using a 20 MHz or 10 MHz band.

FIG. 7F illustrates a configuration of a format-specific field of a VD field when the EHT MU PPDU is indicated in the PPDU format field of the U-SIG. In a case of the MU PPDU, the SIG-B, which is a signaling field for simultaneous reception by multiple users, is essentially required, and the SIG-B may be transmitted after the U-SIG without a separate SIG-A. To this end, information for decoding of the SIG-B needs to be signaled in the U-SIG. These fields include a SIG-B MCS field, a SIG-B DCM field, a number of SIG-B Symbols field, a SIG-B compression field, a number of EHT-LTF Symbols field, etc.

FIG. 8 illustrates an example of various extremely high throughput (EHT) physical protocol data unit (PPDU) formats and a method for indicating the same according to an embodiment of the disclosure.

Referring to FIG. 8, a PPDU may include a preamble and a data part, and an EHT PPDU format, which is one type, may be classified according to a U-SIG field included in the preamble. Specifically, whether the format of the PPDU is an EHT PPDU may be indicated on the basis of a PPDU format field included in the U-SIG field.

Part (a) of FIG. 8 illustrates an example of an EHT SU PPDU format for a single STA. An EHT SU PPDU is a PPDU used for single user (SU) transmission between an AP and a single STA, and an EHT-SIG-A field for additional signaling may be positioned after a U-SIG field.

Part (b) of FIG. 8 illustrates an example of an EHT trigger-based PPDU format which corresponds to an EHT PPDU transmitted on the basis of a trigger frame. An EHT Trigger-based PPDU is an EHT PPDU transmitted one the basis of a trigger frame and is an uplink PPDU used for a response to the trigger frame. Unlike in the EHT SU PPDU, an EHT-SIG-A field is not positioned after a U-SIG field in the EHT PPDU.

Part (c) of FIG. 8 illustrates an example of an EHT MU PPDU format which corresponds to an EHT PPDU for multiple users. An EHT MU PPDU is a PPDU used to transmit the PPDU to one or more STAs. In the EHT MU PPDU format, a HE-SIG-B field may be positioned after a U-SIG field.

Part (d) of FIG. 8 illustrates an example of an EHT ER SU PPDU format used for single user transmission with an STA in an extended range. An EHT ER SU PPDU may be used for single user transmission with an STA of a wider range compared to the EHT SU PPDU described in part (a) of FIG. 8, and a U-SIG field may be repeatedly positioned on a time axis.

The EHT MU PPDU described in part (c) of FIG. 8 may be used by an AP to perform downlink transmission to multiple STAs. In this case, the EHT MU PPDU may include scheduling information so that the multiple STAs may simultaneously receive the PPDU transmitted from the AP. The EHT MU PPDU may transfer, to the STAs, AID information of a transmitter and/or a receiver of the PPDU transmitted via a user specific field of the EHT-SIG-B. Accordingly, the multiple terminals having received the EHT MU PPDU may perform a spatial reuse operation on the basis of the AID information of the user specific field included in a preamble of the received PPDU.

Specifically, a resource unit allocation (RA) field of the HE-SIG-B field included in the HE MU PPDU may include information on a configuration of a resource unit (for example, a division form of the resource unit) in a specific bandwidth (for example, 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of the EHT-SIG-B so as to be transmitted to the STA. That is, the user specific field may include one or more user fields corresponding to the respective segmented resource units.

For example, a user field corresponding to at least one resource unit used for data transmission among the multiple segmented resource units may include an AID of a receiver or a transmitter, and a user field corresponding to the remaining resource units which are not used for data transmission may include a preconfigured null STA ID.

Two or more PPDUs illustrated in FIG. 8 may be indicated by a value indicating the same PPDU format. That is, two or more PPDUs may be indicated by the same PPDU format through the same value. For example, an EHT SU PPDU and an EHT MU PPDU may be indicated by the same value through a U-SIG PPDU format subfield. In this case, the EHT SU PPDU and the EHT MU PPDU may be distinguished from each other by the number of STAS receiving the PPDU. For example, a PPDU receiving only one STA may be identified as the EHT SU PPDU, and when the number of STAs is configured so that a PPDU receives two or more STAs, the PPDU may be identified as the EHT MU PPDU. In other words, two or more PPDU formats illustrated in FIG. 8 may be indicated through the same subfield value.

In addition, some of the fields illustrated in FIG. 8 or some information of a field may be omitted, and such a case where some fields or some information of a field is omitted may be defined as a compression mode or a compressed mode.

Figure 9:
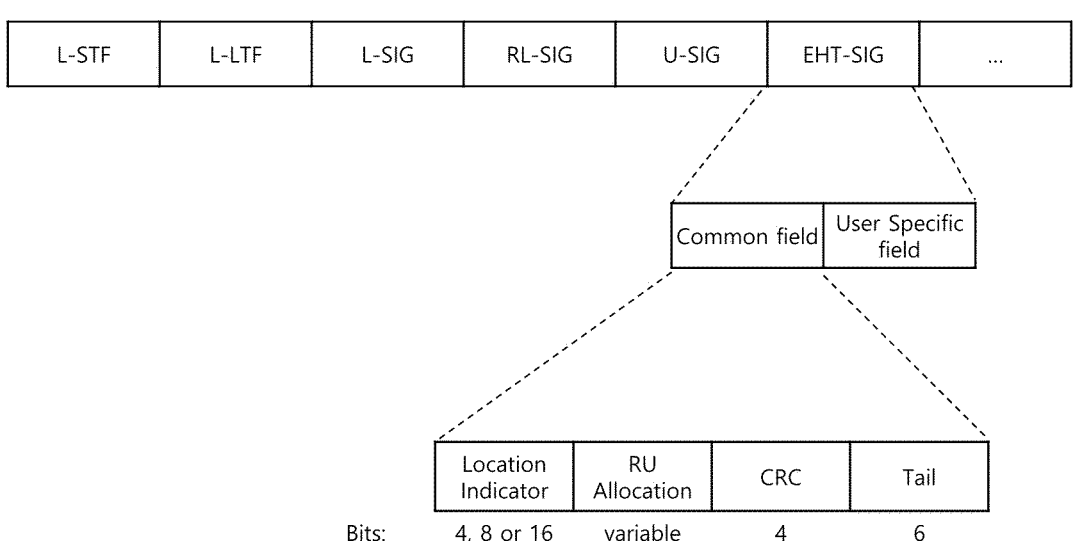
FIG. 9 illustrates an example of an EHT PPDU format according to an embodiment of the disclosure.

FIG. 9 illustrates an example of an EHT PPDU format according to an embodiment of the disclosure.

Referring to FIG. 9, an EHT PPDU may include one or more signaling fields (SIG fields). Specifically, the EHT PPDU may include the L-SIG field, the U-SIG field, the EHT-SIG field, etc. as described in FIGS. 7 and 8, and the EHT-SIG field may include an EHT-SIG-A field and/or an EHT-SIG-B field.

The EHT PPDU includes a preamble and data, and the preamble includes at least one of an L-STF, an L-LTF, an L-SIG, an RL-SIG, a U-SIG, an EHT-SIG, an EHT-STF, and an EHT-LTF. Accordingly, the EHT preamble may be used when indicating one or more of the fields above. The positions and the order of fields included in the preamble may be the order of the fields mentioned above and in FIG. 9.

The L-STF, L-LTF, and L-SIG may be fields for legacy compatible, the RL-SIG and L-SIG may include the same information. That is, a part of the L-SIG or all bit values may be repeatedly configured in the RL-SIG, and the RL-SIG may be used to distinguish a PPDU format.

The EHT-SIG may include a common field and a user specific field, and include resource allocation information for PPDU transmission, STA information for identification of an STA to which a resource is allocated, etc. Accordingly, STAs receiving the PPDU may determine (or recognize) whether a resource has been allocated to the STAs themselves, on the basis of the EHT-SIG, and determine how a resource has been allocated, such as the position and size of the allocated resource.

The common field may include resource unit allocation information for a resource unit (RU) allocated to at least one STA. For example, the RU allocation information may include information on the size, position, configuration of resources allocated to the STAs, the number of STAs to which the RU is allocated, etc.

The user specific field may include information (for example, information on respective STAs) for decoding a payload by STAs (users) receiving a PPDU, and include information on one or more STAs. Specifically, the user specific field may include, in an individual field corresponding to each STA, information (for example, station identifier (STA ID), etc.) on STAs to which the RU is allocated. That is, information corresponding to STA 1 (user 1), information corresponding to STA 2 (user 2), information corresponding to STA 3 (user 3), . . . , and information corresponding to STA N (user N) may be consecutively included in the user specific field. In this case, information on the respective STAs may be included in the user field, and the user field including information on the respective STAs may be consecutively included in the user specific field.

The STA receiving the PPDU may determine whether the RU for reception of the PPDU has been allocated, on the basis of whether an STA ID corresponding to the STA itself, among STA IDs of the user field included in the user specific field, is included. That is, the STA may determine whether the STA ID corresponding to the RU allocated by the RU allocation subfield is an ID of the STA itself, to identify whether the RU has been allocated to the STA itself, and receive a PPDU through the RU allocated to the STA itself.

In addition, information on the STA included in the user field may include information (NSTS) on the number of space-time streams, information (beamformed) on whether a beamforming steering matrix is applied, information on a modulation and coding scheme (MCS), information on whether dual carrier modulation (DCM) is used, information on a coding method (for example, information on a coding method (for example, BBC or LDPD) which is used), etc. In addition, such information may be information applied to a corresponding STA-ID value.

When the common field indicates the structure of RUs allocated to respective STAs and the number of STAs allocated the respective RUs, user fields included in a user specific field may be sequentially mapped to the RUs indicated by the common field. For example, RU1 is allocated to one STA, RU2 is allocated to two STAs, and RU3 is allocated to one STA by an RU allocation subfield of the common field, and the user specific field may include four user fields (user field 1, user field 2, user field 3, and user field 4) in order. In this case, RU 1 may be allocated to an STA corresponding to an STA ID included in user field 1, and RU 2 may be allocated to STAs corresponding to STA IDs included in user field 2 and user field 3, respectively. Similarly, RU 3 may be allocated to an STA corresponding to an STA ID included in user field 4. When two or more STAs are allocated to one RU as in the case of RU 2, MIMO may be used.

The common field and the user specific field may be included in the ETH-SIG in order, as shown in FIG. 9.

Hereinafter, the term "field" and the term "subfield" may be interchangeably used in the disclosure, and the disclosure is not limited to the terms.

The EHT PPDU may further include a location indicator, and in this case, the location indication subfield may be included in the common field of the EHT-SIG, as shown in FIG. 9. The location indicator subfield may be referred to as a header field, and may be used to indicate the positions and the number of RU allocation subfields of the common field.

Specifically, the location indicator subfield may perform a role of indicating the location corresponding to an RU allocation subfield, and thus the location of the RU indicated by a user field may be determined on the basis of not only the RU allocation subfield but also the location indicator subfield. For example, the location indicator subfield may indicate start locations of RUs indicated by the RU allocation subfield and/or the location of the last allocated RU, and may indicate the number of RU allocation subfields. In this case, the RU allocation subfield means a field included in the common field of the EHT-SIG, described above.

The location indicator subfield may be configured by multiple bits, and may correspond to a predetermined unit of band on a frequency axis. For example, the multiple bits constituting the location indicator field may be mapped to non-overlapping bands, respectively. That is, bits of the location indicator subfield may be mapped to correspond to 20 MHz subbands, respectively, and in this case, the respective bits may be sequentially mapped according to the frequency order of the 20 MHz subbands. In other words, location indicator subfields may be sequentially mapped to bits of the location indicator subfield according to the frequency order of the bands in predetermined units.

For example, the respective bits may be sequentially mapped, according to the frequency order, to the first 20 MHz bands of primary 20 MHz (P20), secondary 20 MHz (S20), and secondary 40 MHz (S40), the second 20 MHz band of S40, the first 20 MHz band of secondary 80 (S80), the second 20 MHz band of S80, the third 20 MHz band of S80, the fourth 20 MHz band of S80, the first 20 MHz band of S160 (a band remaining after excluding P80 and S80 may be called S160), the second 20 MHz band of secondary 160 MHz (S160), the third 20 MHz band of S160, the fourth 20 MHz band of S160, the fifth 20 MHz band of S160, the sixth 20 MHz band of S160, the seventh 20 MHz band of S160, and the eight 20 MHz band of S160.

For example, when a specific bit constituting the location indicator subfield is 1, an RU allocation subfield related to a band mapped to the specific bit may be included in the common field. In addition, a specific bit constituting the location indicator subfield is 0, an RU allocation subfield related to a band mapped to the specific bit may not be included in the common field. Accordingly, the number of RU allocation subfields included in the common field may be determined on the basis of a value of each of the bits of the location indicator subfield.

Therefore, the number of the RU allocation subfields of the common field may be identified on the basis of a specific field located before the RU allocation subfield.

The length (or the size) of the location indicator subfield may be based on a bandwidth or a channel width of a PPDU. In this case, the bandwidth or the channel width may be indicated through a bandwidth field included in a U-SIG field, and may mean a bandwidth or a channel width occupied by a PPDU including the U-SIG field of the bandwidth field.

For example, the length of the location indicator subfield may be 4 bits, 8 bits, or 16 bits. In this case, when the bandwidth is 80 MHz, 160 MHz, and 320 MHZ, the size of the location indicator subfield may be 4 bits, 8 bits, and 16 bits, respectively.

In addition, the length of the location indicator subfield may be based on puncturing information indicated by the U-SIG field. In this case, the puncturing information may be indicated by the bandwidth field of the U-SIG field. For example, when a bandwidth occupied by the PPDU is indicated by the bandwidth field, puncturing information may be also indicated. That is, when the bandwidth of the PPDU is indicated by the bandwidth field, puncturing information indicating whether puncturing is performed for the indicated bandwidth may be also indicated.

For example, the location indicator subfield may not include a bit for a punctured channel (band) indicating the puncturing information, and may include a bit for unpunctured channel (band) indicated by the puncturing information. That is, the location indicator subfield may include a bit related to the unpunctured channel (band).

In addition, according to an embodiment of the disclosure, the length and a value of the location indicator subfield may vary according to a band. For example, a location indicator subfield included in a PPDU of P160 and a location indicator subfield included in a PPDU of S160 may have different lengths and values from each other.

That is, multiple EHT-SIG fields (or EHT-SIG content channels) of a PPDU may be repeatedly transmitted at each bandwidth unit channel (for example, 20 MHz) within a bandwidth of the PPDU according to the bandwidth of the PPDU. In this case, values of fields included in a U-SIG field of the PPDU may be configured by the same value for each bandwidth unit channel, some of fields included in the EHT-SIG field may be configured by the same value, and the other fields may be configured to be identical or have different values.

For example, when a bandwidth of a PPDU is 80 MHz, a total of four EHT-SIG fields (or EHT-SIG content channels) may be repeated (or copied) and transmitted in units of 20 MHz. In this case, some fields of the EHT-SIG field may be configured by the same value for four channels in units of 20 MHz, and the other fields may be configured by the same value or different values. That is, as values of the total of bits or some bits of the location indicator subfield, the same value or different values may be configured between EHT-SIG fields in each 20 MHz channel. However, the lengths and values of the location indicator subfields transmitted in primary 80 and secondary 80 may be different from each other.

As described in FIG. 9, the common field included in the EHT-SIG field may include the location indicator subfield, and the location indicator subfield may be positioned before the RU allocation subfield. For example, the location indicator field may be included in at the foremost position of the common field.

In addition, the EHT-SIG of the EHT PPDU may include the RU allocation subfield. As described above, the RU allocation subfield may indicate the configuration and location of allocated RUs, and the number of STAs (or users) allocated to each RU. Accordingly, the number of user fields included in a user specific field may be determined according to the RU allocation subfield. That is, the user field includes information of an STA to which an RU is allocated, and thus the number of user fields included in the user specific field may be identified according to the number of STAs to which the RU is allocated by the RU allocation subfield.

The number of RU allocation subfields included in the EHT PPDU may be determined on the basis of a specific field. Specifically, the number of RU allocation subfields included in the EHT PPDU may be based on the location indicator subfield. For example, the number of RU allocation subfields may be based on the number of "1"s among bits of the location indicator subfields. That is, there may be N RU allocation subfields of unit lengths. In addition, N may be based on the location indicator subfield, and in a compression mode, N may be 0.

Accordingly, the number and/or the locations of RU allocation subfields may be identified by the location indicator subfield, and the size and value of the location indicator subfield may be identified by a bandwidth by a bandwidth field of the U-SIG field. That is, the size and value of the location indicator subfield may be determined on the basis of the bandwidth field of the U-SIG field, and the number and/or the locations of RU allocation subfields may be identified by the location indicator subfield. Consequently, the number of RU allocation subfields may be determined by the bandwidth field of the U-SIG field.

The EHT-SIG field may include a cyclic redundancy code subfield and a tail subfield. The CRC included in the EHT-SIG field may be calculated by the location indicator subfield and the RU allocation subfield. In addition, the tail subfield may be used to complete trellis of a convolutional decoder. The tail subfield may be used to flush the convolutional decoder. A receiver or a decoder may need to decode a CRC and subfields corresponding to the CRC all together. Accordingly, decoding may be possible when the subfields corresponding to the CRC are pre-configured.

As described above, the common field included in the EHT-SIG field may include the location indicator subfield, the RU allocation subfield, the CRC, and the tail.

FIG. 10 illustrates a structure of a preamble according to an embodiment of the disclosure.

According to an embodiment of the disclosure, a U-SIG field or an EHT-SIG field may have different values for each unit band. For example, the unit band may be an 80 MHz band or a 160 MHz band. Referring to FIG. 10, the EHT-SIG field may vary according to an 80 MHZ sub-band. In an embodiment of FIG. 10, a bandwidth of a PPDU is 320 MHz, and 80 MHZ sub-band 1, 80 MHZ sub-band 2, 80 MHZ sub-band 3, and 80 MHZ sub-band 4 include EHT-SIG 1, EHT-SIG 2, EHT-SIG 3, and EHT-SIG 4, respectively. In addition, a receiver of the PPDU may perform PPDU reception even though a specific 80 MHZ U-SIG field or EHT-SIG field is decoded.

In addition, an EHT-SIG field in a unit band may have multiple content channels (CCs). The different content channels may mean having different common field values, different RU allocation subfield values, and/or different location indicator subfield values. For example, the EHT-SIG field may have two content channels. Referring to FIG. 10, each EHT-SIG field in the 80 MHz sub-band may have CC1 and CC2. That is, multiple content channels of the EHT-SIG field may include subfields having the same value between content channels and/or subfields having different values between the content channels.

For example, some fields of a common field of the EHT-SIG content channel may have the same value between content channels, and the other fields (for example, an RU allocation subfield, a user specific subfield, etc.) may have different values between content channels. In this case, some or all bit values between the content channels may be identical or different from each other according to the role of the location indicator subfield. For example, some bits of the location indicator subfield perform a role of a center 26-tone RU subfield, such bits may have the same value between the content channels.

In this case, in the common field of the EHT-SIG field, a specific subfield having the same value between respective EHT-SIG content channels is as follows.

Figure 11:
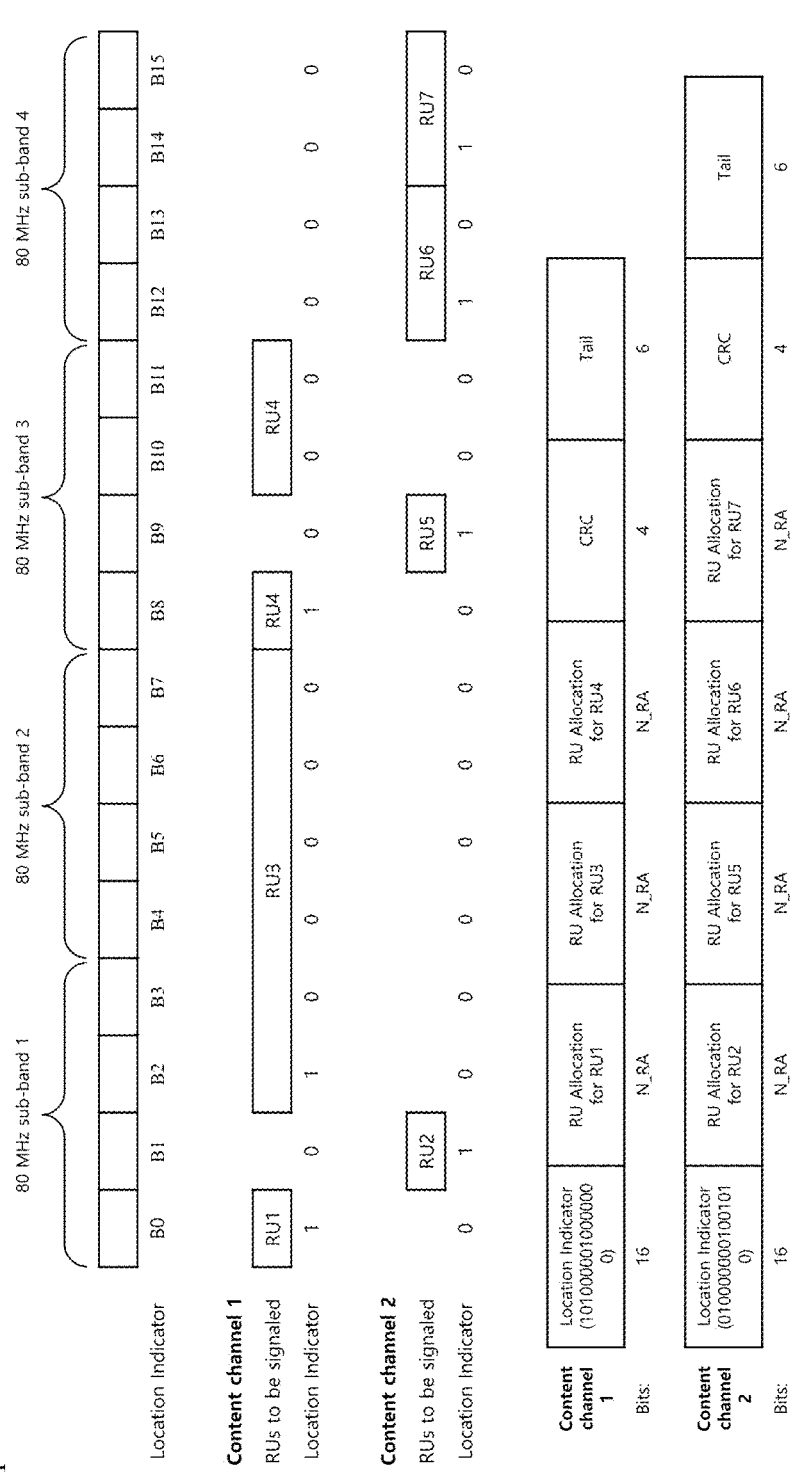
FIG. 11 illustrates a configuration of an EHT-SIG field according to an embodiment of the disclosure.

Spatial Reuse
LDPC Extra Symbol Segment
GI+LTF size
Number Of EHT-LTF symbols
Pre-FEC padding Factor
PE Disambiguity FIG. 11 illustrates a configuration of an EHT-SIG field according to an embodiment of the disclosure.

FIG. 11 illustrates configuration of an EHT-SIG field and the use of a location indicator subfield and an RU allocation subfield, described in FIG. 9, and the contents described above may be omitted.

As described above, each bit of a location indicator subfield may correspond to a pre-configured band. For example, each bit of the location indicator subfield may correspond to a 20 MHz sub-band. In this case, each bit of the location indicator subfield may sequentially indicate each of 20 MHz sub-bands starting from a low frequency. FIG. 11 illustrates an example of a 320 MHz band. Referring to FIG. 11, the location indicator subfield may be configured by bits indicated as B0 to B15. In addition, each bit may correspond to a 20 MHZ sub-band, and B0 to B15 may indicate the total 320 MHz band.

In addition, the location indicator subfield may indicate the location of an RU to be signaled in the corresponding content channel. Alternatively, the location indicator subfield may indicate the location corresponding to an RU allocation subfield to be signaled in the corresponding content channel. Referring to FIG. 11, content channel 1 may indicate RU1, RU3, and RU4, and content channel 2 may indicate RU2, RU5, RU6, and RU7. A location indicator subfield of content channel 1 indicates starting locations of RU1, RU3, and RU4, and a location indicator subfield of content channel 2 indicates starting locations of RU2, RU5, RU6, and RU7. A value of 1 in the location indicator subfield may indicate a start of a band corresponding to the signaled RU allocation subfield. Accordingly, B2 of the location indicator subfield of content channel 1 is indicated as 1 to indicate the existence of an RU allocation subfield corresponding to RU 3 corresponding to an RU of a band corresponding to B2 to B7. In addition, RU4 may use multiple RUs. RU4 may use both a band corresponding to B8 and a band corresponding to B10 to B11. To indicate this, B8 of the location indicator subfield may be configured as 1.

As described above, the location indicator subfield may indicate the location of a band corresponding to RU allocation. The actual RU size may be indicated in the RU allocation subfield.

Referring to FIG. 11, the location indicator subfield of content channel 1 indicates the existence and the location of each of RU1, RU3, and RU4, thus there may be RU allocation subfields corresponding to RU1, RU3, and RU4, and the location at which the RU allocation subfield exists may be content channel 1. Similarly, the location indicator subfield of content channel 2 indicates the existence and the location of each of RU2, RU5, RU6, and RU7, thus there may be RU allocation subfields corresponding to RU2, RU5, RU6, and RU7, and the location at which the RU allocation subfield exists may be content channel 2. In addition, RU allocation subfields may exist in the order of the RU allocation subfield indicated by the location indicator subfield. That is, when the location indicator subfield may indicate the existence of the RU allocation subfield and bit value 1 of the location indicator subfield indicates the existence of the RU allocation subfield, bits each having a value of 1 in the location indicator subfield may be sequentially mapped to the RU allocation subfield. That is, the first RU allocation subfield may correspond to the first bit having a value of 1 in the location indicator subfield, and the second RU allocation subfield may correspond to the second bit having a value of 1 in the location indicator subfield. Referring to FIG. 11, an RU allocation subfield corresponding to B0 which is the first bit having a value 1 in the location indicator field in content channel 1 may appear first, an RU allocation subfield corresponding to B2 which is the second bit having a value of 1 in the location indicator field may appear second, and an RU allocation subfield corresponding to B8 which is the third bit having a value of 1 in the location indicator field may appear third.

Accordingly, the number of bits each having bit value 1 of the location indicator subfield may indicate the number of RU allocation subfields. Alternatively, a value based on the number of bits each having bit value 1 of the location indicator subfield may indicate the number of RU allocation subfields. In this case, the length of each RU allocation subfield may be N_RA bits.

Content channel 1 and content channel 2 shown in FIG. 11 may be CC1 and CC2 in a unit band, as shown in FIG. 10. Alternatively, content channel 1 and content channel 2 shown in FIG. 11 may indicate different EHT-SIGs for each unit band, as shown in EHT-SIG1 and EHT-SIG2 in FIG. 10.

By using RU signaling based on the location indicator field, free signaling is possible in any content channel. More specifically, signaling of any RU in any location is possible in any content channel.

In addition, CRC and tail subfields may exist after the location indicator subfield and the RU allocation subfield. In this case, the CRC may correspond to the location indicator subfield and the RU allocation subfield. That is, the location indicator subfield, the RU allocation subfield, and the CRC may be decoded together.

However, according to an embodiment of the disclosure, the number of RU allocation subfields is variable and the number of RU allocation subfields is determined on the basis of a location indicator subfield value, and thus it is difficult to determine the length of a bit sequence decoded together with the CRC. That is, it may be difficult to determine the lengths of the location indicator subfields and the RU allocation subfields, which are used for CRC calculation. Alternatively, decoding with the CRC is needed for an STA to identify a value of the location indicator subfield, but it is difficult for the STA to perform decoding since the STA does not know the length of the RU allocation subfield used together for the CRC calculation.

FIGS. 12A and 12B illustrate an example of an RU allocation subfield according to an embodiment of the disclosure.

FIGS. 12A and 12B illustrate RU allocations and values of the RU allocation subfield described in FIGS. 9 to 11. 26, 52, 106, 78, 132, etc. shown in FIGS. 12A and 12B may be the number of tones used by RUs. Each bit value of the RU allocation subfield may correspond to each value of a specific row in FIGS. 12A and 12B, and RUs may be allocated to STAs, respectively, upon the configuration (or structure) of RUs according to the corresponding row.

The STAs to which the RUs are allocated, respectively, according to the RU allocation subfield, may be identified by a user field located after the RU allocation subfield of the common field. That is, when the configuration of RUs allocated to STAs and the number of STAs to use the respective RUs are configured by respective bits of the RU allocation subfield, the STAs allocated to the RUs, respectively, may be identified by a user field included in a user specific field located after the RU allocation subfield.

For example, when an RU allocation subfield is configured as a value of the first row (B9:0, B8 . . . B0:0) in FIG. 12A, this may be a structure in which nine 26-tone RUs are allocated. In this case, a user field for identifying STAs corresponding to the respective 26-tone RUs may be located to be included in a user specific field.

As another embodiment of the disclosure, an RU smaller than a 242-tone RU may be called a small RU or a small-size RU. In addition, an RU equal to or greater than the 242-tone RU may be called a large RU or a large-size RU. FIGS. 12A and 12B are examples showing RU allocation values corresponding to the small-size RU, and in addition, the RU allocation subfield may indicate the large-size RU as shown in FIGS. 13A and 13B.

FIGS. 13A and 13B illustrate another example of an RU allocation subfield according to an embodiment of the disclosure.

Similar to FIGS. 12A and 12B, FIGS. 13A and 13B illustrate RU allocations and values of the RU allocation subfield described in FIGS. 9 to 11. 242, 484, 996, 996×2, etc. shown in FIGS. 13A and 13B may be the number of tones used by RUs. In addition, a value of the RU allocation subfield may correspond to a row in FIGS. 13A and 13B, and RUs having the structure indicated by the row may be allocated to STAs. In addition, a user field corresponding to an RU indicated by an RU allocation subfield may exist after the RU allocation subfield. For example, when an RU allocation subfield indicates a value of the first row (B9:1, B8 . . . B0:00000y3y2y1y0) in FIG. 13A, this may be a structure in which a 242-tone RU is allocated. In this case, user fields corresponding to the 242-tone RU may exist thereafter. In addition, each row shown in FIGS. 13A and 13B corresponds to OFDMA, and users are may not be additionally divided. That is, for example, when an RU allocation subfield indicates a value of the fifth row (B9:1, B8 . . . B0:00100y3y2y1y0) in FIGS. 13A and 13B, 242-tone and 484-tone RUs are indicated, but both 242-tone and 484-tone RUs may be allocated to one user. In addition, different STAs may be allocated to the same RU as MIMO.

In addition, in an embodiment, an RU smaller than a 242-tone RU may be called a small RU or a small-size RU. In addition, an RU equal to or greater than the 242-tone RU may be called a large RU or a large-size RU. FIGS. 13A and 13B are examples showing RU allocation values corresponding to the large-size RU, and in addition, the RU allocation subfield may indicate the small-size RU as shown in FIGS. 12A and 12B.

Figure 14:
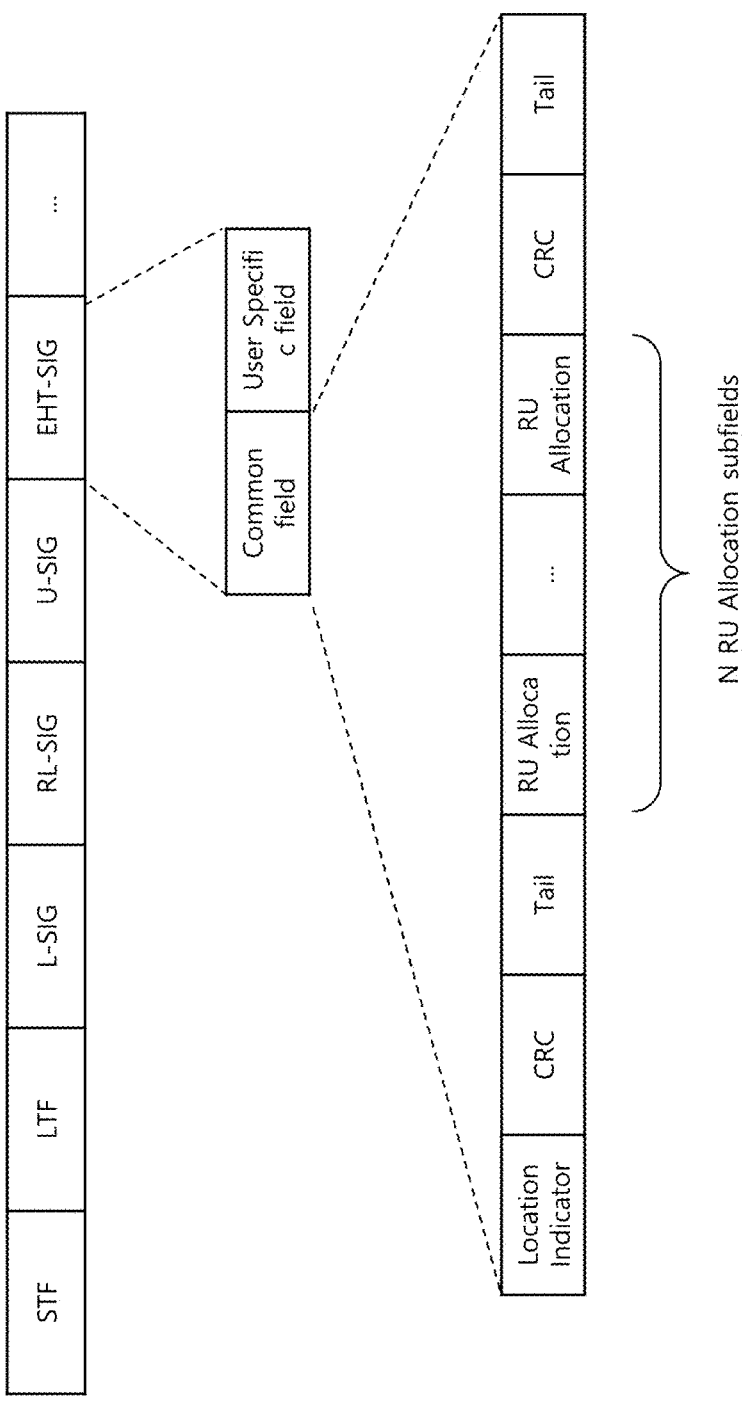
FIG. 14 illustrates an EHT-SIG structure according to an embodiment of the disclosure.

FIG. 14 illustrates an EHT-SIG structure according to an embodiment of the disclosure.

An embodiment of FIG. 14 relates to a method for resolving the problem described in FIG. 11, and the same contents as the contents described above may be omitted.

According to an embodiment of the disclosure, a location indicator subfield may have an EHT-SIG structure enabling performing decoding independently from RU allocation subfields. For example, there may be a CRC and a tail corresponding to the location indicator subfield separately from a CRC and a tail corresponding to RU allocation subfields. Referring to FIG. 14, an EHT-SIG field or a common field may sequentially include a location indicator subfield, a CRC, a tail, an RU allocation subfield, a CRC, and a tail. That is, the CRC corresponding to the location indicator subfield may exist before the RU allocation subfield. That is, the CRC corresponding to the location indicator subfield may correspond to bits of the number (for example, 4, 8, or 16) of bits of the location indicator subfield from B0 of the EHT-SIG.

In addition, the CRC corresponding to the RU allocation subfield may correspond to bits of (the number of RU allocation subfield bits)*(the number of RU allocation subfields) from a bit after the location indicator subfield, CRC, and tail.

Accordingly, a receiver or a decoder may determine first decode a value of the location indicator subfield with the subsequent corresponding CRC, then determine the number of RU allocations subfields, and decode the RU allocation subfield with the subsequence corresponding CRC. More specifically, the length of the location indicator subfield may be determined on the basis of a band value indicated by a U-SIG field. That is, as described above, the length of the location indicator subfield may be determined on the basis of a bandwidth of a PPDU indicated by a bandwidth field of the U-SIG field. Accordingly, the location indicator subfield may be decoded together with the corresponding CRC. In addition, the number of RU allocation subfields may be identified on the basis of the decoded location indicator subfield value, and the RU allocation subfield may be decoded together with the corresponding CRC.

According to another embodiment of the disclosure, the number of RU allocation subfields may be indicated by a field (for example, a U-SIG field) preceding the EHT-SIG field. In such a case, decoding the structure described in FIG. 9 is possible. That is, even in a case where CRC calculation is based on the location indicator subfield and the RU allocation subfield, the length of the RU allocation subfield can be identified, and thus decoding is possible. For example, when the number of RU allocation subfields may be identified by a bandwidth field of the U-SIG field preceding the EHT-SIG, the length of the RU allocation subfield can be identified through the bandwidth field, and thus decoding of the RU allocation field is possible even in a case where CRC calculation is based on the RU allocation subfield.

However, when free signaling is possible due to signaling based on the location indicator subfield, the number of RU allocation subfields may vary depending on a sub-band (for example, 20 MHz band), and indicating all different numbers of RU allocation subfields by the U-SIG field may increase signaling overhead. Accordingly, according to an embodiment, it is possible to configure the same number of RU allocation subfield for each sub-band. For example, a maximum number of RU allocation subfields actually signaled in each sub-band may be indicated by the U-SIG field, and a dummy RU allocation subfield may be inserted for a sub-band smaller than the maximum number.

According to another embodiment, the number of RU allocation subfields indicated by the U-SIG may be equally distributed to and included in each content channel. However, when the number of RU allocation subfields indicated by the U-SIG cannot be evenly divided by the number of content channels, the number of RU allocation subfields distributed to each content channel may be divided so that a difference in number between the respective RU allocation subfields is equal to or less than 1.

Figure 15:
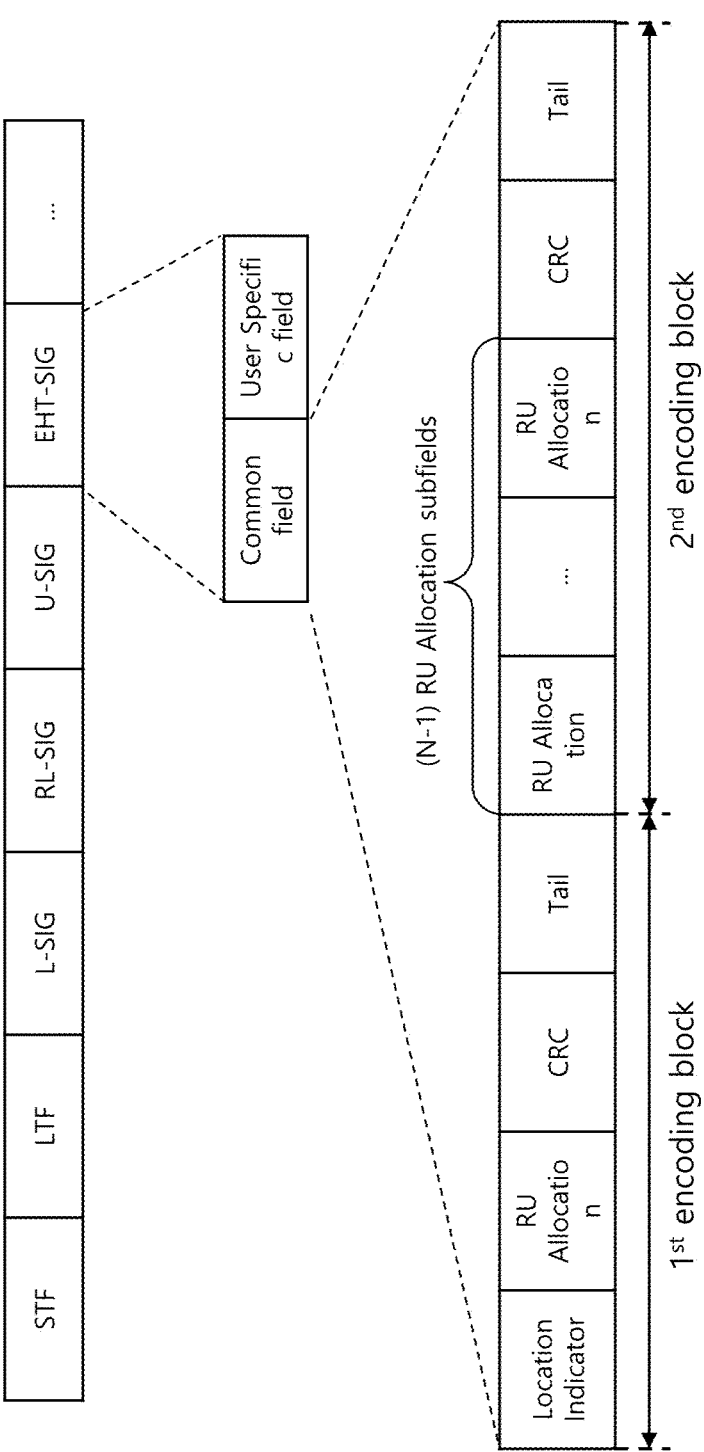
FIG. 15 illustrates another example of an EHT-SIG structure according to an embodiment of the disclosure.

FIG. 15 illustrates another example of an EHT-SIG structure according to an embodiment of the disclosure.

Referring to FIG. 15, a common field may be divided into respective encoding blocks according to an encoding method, and each of the encoding blocks may include an RU allocation subfield. In this case, one or more encoding blocks may be included according to a bandwidth indicated by a bandwidth field of a U-SIG field, and each of the encoding blocks may be individually encoded. Accordingly, an STA may individually encode an encoding block.

Specifically, an embodiment of FIG. 15 may be provided to solve the problem described in FIG. 11, and may be provided to extend the embodiment of FIG. 14. Accordingly, the same contents as the contents described above may be omitted.

In the embodiment of FIG. 14, it is possible to use only the location indicator subfield for CRC calculation, and the number of bits of the CRC and the tail may be greater than the number of bits of the location indicator subfields. That is, redundancy is greater.

Accordingly, according to an embodiment of the disclosure, the location indicator subfield and a pre-configured number of RU allocation subfields may be used for CRC calculation. In addition, there may be a separate CRC for RU allocation subfields remaining after excluding the pre-configured number of RU allocation subfields. Accordingly, referring to FIG. 15, the EHT-SIG field or the common field may be divided into a first encoding block and a second encoding block on the basis of a unit of an encoded field. In this case, fields included in the respective encoding blocks are encoded together, and different encoding blocks may be encoded respectively. Accordingly, an STA receiving a PPDU may individually decode each encoding block according to the encoding block.

As illustrated in FIG. 15, the first encoding block may include a location indicator subfield, a pre-configured number of RU allocation subfields (at least one first RU allocation subfield), a CRC (first CRC), a tail (first tail), and these subfields may be encoded together. The second encoding block may include the remaining RU allocation subfields (at least one second RU allocation subfield), a CRC (second CRC), and a tail (second tail), and these subfields may be encoded together. FIG. illustrates a case where the pre-configured number is 1.

Accordingly, a receiver or a decoder may sequentially decode each of the encoding blocks. Specifically, the receiver or the decoder may first decode values of the location indicator subfield and the pre-configured number of RU allocation subfields, included in the first encoding block, together with the subsequence CRC, and then determine the number N of RU allocation subfields. If N is equal to or less than the pre-configured number, the RU allocation subfield is already signaled, and thus the subsequent RU allocations subfield, CRC, and tail may not additionally exist.

If N is greater than the pre-configured number, (N−(the pre-configured number)) RU allocation subfields, a CRC, and a tail may additionally exist. Accordingly, the receiving or the decoder may decode the first encoding block, and then decode the (N−(the pre-configured number)) RU allocation subfields, included in the second encoding block, together with the subsequent CRC.

If N is 0, the already signaled RU allocation subfield may be dummy data, and the subsequent RU allocation subfield, CRC, and tail may not additionally exist. Accordingly, the receiver may ignore the dummy data, and the subsequent user field may not exist.

RU1 (one STA), RU2 (two STAs), and RU3 (one STA) may be indicated, and a user specific field may sequentially include user field 1, user field 2, user field 3, and user field 4. In this case, user field 1 may correspond to RU1, user field 2 may correspond to RU2, user field 3 may correspond to RU2, and user field 4 may correspond to RU3. In addition, like RU2 (two STAs), when multiple users are allocated to the same RU, it may be a case where MIMO is used.

In this case, the number of encoding blocks may vary depending on a bandwidth of a PDDU, indicated by a bandwidth field of a U-SIG field. For example, a bandwidth of a PPDU, indicated by a bandwidth field, is 20, 40, or 80 MHz, only one or two RU allocation subfields are required, and thus only one encoding block may be included in a common field. In this case, when the indicated bandwidth is 20 or 40 MHz, one RU allocation subfield may be included, and when the indicated bandwidth is 80 MHz, two RU allocation subfields may be included.

The number of RU allocation subfields according to the bandwidth indicated by the bandwidth field may mean the number of RU allocation subfields included in each EHT-SIG content channel.

In this case, one encoding block is included in the common field of the EHT-SIG field, and thus values of the location indicator subfield and a pre-configured number of RU allocation subfields may be decoded together with the subsequent corresponding CRC.

However, when the bandwidth of the PPDU, indicated by the bandwidth field, is equal to or higher than 160 MHz (for example, 160 MHz or 320 MHz), three or more RU allocation subfields are required, and thus two encoding blocks may be included in the common field. In this case, two encoding blocks, which are the first encoding block and the second encoding block, are individually encoded and/or decoded, and thus each encoding block may individually include a CRC and a tail.

As described above, the first encoding block may include a location indicator subfield, at least one RU allocation subfield, a CRC, and a tail, and the second encoding block may include at least one RU allocation subfield, a CRC, and a tail.

In this case, the first encoding block may further include a spatial reuse subfield indicating whether spatial reuse is performed, a GI+LTF size subfield indicating a GI duration and EHT-LTF size, a number of EHT LTE symbols field indicating the number of EHT-LTF symbols, an LDPC extra symbol sequence subfield indicating whether there is a LDPC extra symbol sequence, a pre-FEC padding factor subfield indicating a pre-FEC padding factor, a PE disambiguity subfield indicating PE disambiguity, and the like, and these subfields may be encoded/decoded together.

Figure 16:
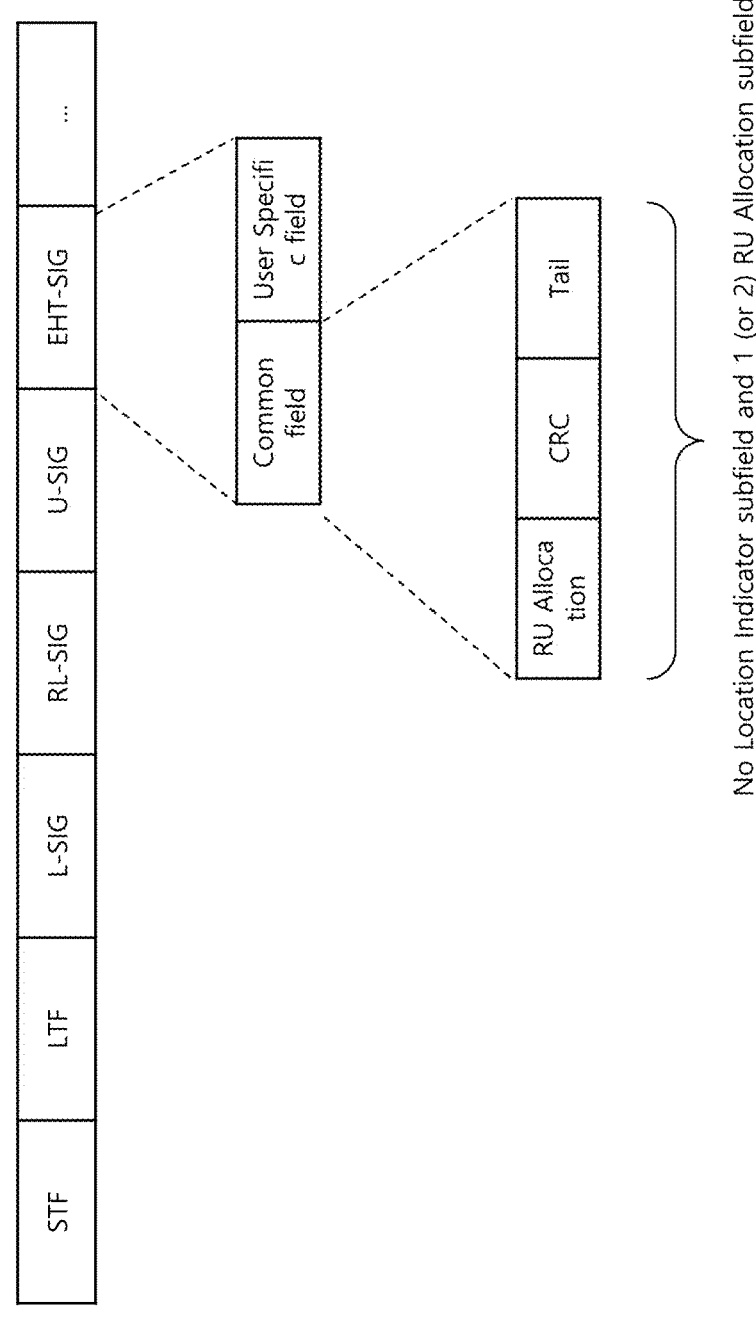
FIG. 16 illustrates an example of an EHT-SIG structure when a bandwidth of a PPDU is 20 MHz or 40 MHz according to an embodiment of the disclosure.

FIG. 16 illustrates an example of an EHT-SIG structure when a bandwidth of a PPDU is 20 MHz or 40 MHz according to an embodiment of the disclosure. The same contents in FIG. 16 as the contents described above are omitted.

According to an embodiment, there may be no location indicator subfield on the basis of a bandwidth (or channel width). The bandwidth may be a PPDU bandwidth. In addition, the bandwidth may be a bandwidth value included in a U-SIG field. For example, when the bandwidth is 20 MHz or 40 MHz, there may be no location indicator subfield.

In an embodiment, when the bandwidth is 20 MHz, there may be one RU allocation subfield. In addition, the RU allocation subfield may correspond to a 20 MHz band. Accordingly, referring to FIG. 16, an EHT-SIG field or a common field may include one RU allocation subfield, a CRC, and a tail. In addition, the CRC may be for the one RU allocation subfield.

In an embodiment, when the bandwidth is 40 MHz, there may be two RU allocation subfields in the entire content channel. Accordingly, two content channels have RU allocation subfields, respectively, and include a CRC and a tail corresponding to each RU allocation subfield. In another embodiment, when the bandwidth is 40 MHz, each content channel may include two RU allocation subfields, and include a CRC and a tail corresponding to two RU allocation subfields. This may be advantageous that RU allocation signaling can be freely performed, compared to a case of including RU allocation subfield in content channels, respectively. In addition, the case of including RU allocation subfields in content channels, respectively, may be advantageous that signaling overhead can be reduced.

According to an embodiment of the disclosure, when the bandwidth is 80 MHz or higher, a location indicator subfield may exist.

FIG. 17 illustrates an EHT-SIG structure of an 80 MHz PPDU according to an embodiment of the disclosure.

In an embodiment of FIG. 17, the same contents as the contents described above may be omitted, and the number of bits of one RU allocation subfield may be indicated as N_RA.

According to an embodiment of the disclosure, when the bandwidth is 80 MHz, a location indicator subfield may be included. The location indicator subfield in the case where the bandwidth is 80 MHz may be identical to the location indicator subfield described above.

For example, the location indicator subfield may be 4 bits and each bit may correspond to a 20 MHz band. In the location indicator subfield-based signaling, when each bit of the location indicator subfield indicates a 20 MHz band, each content channel may include up to four RU allocation subfields. However, to reduce signaling overhead of the EHT-SIG field by using multiple content channels, the number of RU allocation subfield which each content channel can include may be limited. This is because when the bandwidth is 80 MHz and a maximum of four RU allocation subfields are used in the entire content channel, all types of RU allocation may be signaled. Accordingly, according to an embodiment of the disclosure, one or two RU allocation subfields may exist in each content channel. In addition, the number of content channels may be 2. Part (a) of FIG. 17 illustrates an example in which each of two content channels includes a location indicator subfield (4 bits), one or two RU allocation subfields, a CRC, and a tail. Also in this case, as described in FIG. 11, a problem that the length of the RU allocation subfield cannot be identified before the location indicator subfield is identified may occur, and thus the problem can be solved by utilizing the embodiments described in FIGS. 14 and 15.

However, in a case of the embodiment of part (a) of FIG. 17, there are only two cases in which each content channel has one or two RU allocations, but this is indicated by a 4-bit location indicator subfield. Accordingly, to reduce signaling overhead, the number of RU allocation subfields may be indicated through 1-bit signaling. For example, the 1-bit signaling may be included in a common field.

Referring to part (b) of FIG. 17, a more RU allocation subfield may be the 1-bit signaling. Accordingly, each content channel may include a more RU allocation subfield, one or two RU allocation subfields, a CRC, and a tail. Also in this case, as described in FIG. 11, a problem similar to the problem that the length of the RU allocation subfield cannot be identified before the location indicator subfield is identified may occur. A problem that the length of the RU allocation subfield cannot be identified before the more RU allocation subfield of part (b) of FIG. 17 is identified may occur.

Accordingly, to solve this problem, the embodiments described in FIGS. 14 and 15 can be utilized. An embodiment of using a more RU allocation subfield rather than the location indicator subfield of the embodiments of FIGS. 14 and 15 may be performed. That is, there may be a CRC for a more RU allocation subfield separately from a CRC for an RU allocation subfield. Alternatively, the more RU allocation subfield and a pre-configured number (one) of RU allocation subfields are used for CRC calculation, and if there are more RU allocation subfields, a CRC and a tail may additionally exist. Accordingly, the more RU allocation subfield can be decoded even without identifying the number of RU allocation subfields. In another embodiment, the more RU allocation subfield may be included in a U-SIG field. For example, the more RU allocation subfield included in the U-SIG field may be a subfield used for other purposes in a case where a PPDU is not an 80 MHZ PPDU. For example, puncturing information or a bandwidth field may be used as the more RU allocation subfield.

According to an embodiment of part (c) of FIG. 17, a location indicator subfield or a more RU allocation subfield may not exist. When a bandwidth is 80 MHz, the number of bits of the location indicator subfields or the more RU allocation subfields is less than a case of using a higher bandwidth, and thus it is possible to omit these bits and include multiple RU allocation subfields. For example, each content channel may include two RU allocation subfields. Accordingly, as shown in part (c) of FIG. 17, when there are two content channels, a total of four RU allocation subfields may be included, and all types of RU allocation may be expressed. Accordingly, simpler implementation than a case of decoding the location indicator subfield or the more RU allocation subfield is possible. In another embodiment, each content channel may include four RU allocation subfields. In this case, each of the four RU allocation subfields may correspond to a 20 MHz band. That is, each content channel can signal the total 80 MHz band, and free signaling can be performed.

The role of the location indicator subfield in the embodiment of part (a) of FIG. 17 has been reduced in the embodiments of the parts (b) and (c) of FIG. 17, and thus the location at which a channel (band) corresponding to RU allocation subfield is located may need to be determined in parts (b) and (c) of FIG. 17. For example, each of the RU allocation subfields may correspond to a pre-configured channel. For example, RU allocation subfields of content channel 1 may correspond to the first 20 MHz channel and the third 20 MHZ channels, respectively, in ascending order of the frequency. In addition, RU allocation subfields of content channel 2 may correspond to the second 20 MHz channel and the fourth 20 MHz channel, respectively, in ascending order of the frequency. The channels corresponding to the RU allocation subfields of each content channel are not limited thereto, and there may be another pre-configured channel.

Figure 18:
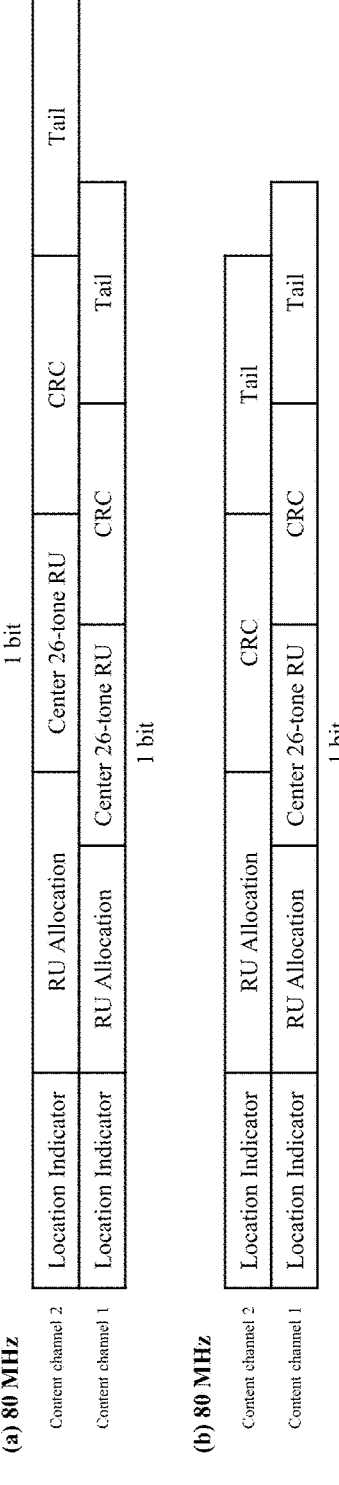
FIG. 18 illustrates an example of center 26-tone RU signaling according to an embodiment of the disclosure.

FIG. 18 illustrates an example of center 26-tone RU signaling according to an embodiment of the disclosure. In the embodiment of FIG. 18, the contents described in FIG. 17, etc. may be omitted.

According to an embodiment of the disclosure, a bandwidth of a PPDU may include a center 26-tone RU. For example, the center 26-tone RU may be a 26-tone RU existing at the center of an 80 MHz PPDU. In addition, when a subcarrier index of a DC tone is 0, the center 26-tone RU may be an RU of subcarrier index [−16:−4, 4:16]. This may be an index in a case of the 80 MHz PPDU. In a case of a 160 (80+80) MHz PPDU, there may be a center 26-tone RU at the center of each 80 MHz. That is, there may be two center 26-tone RUs. In a case of the 160 (80+80) MHz PPDU, subcarrier indices of two center 26-tone RUs may be [−528:−516, −508:−496], [496:508, 516:528]. In addition, in a case of a 240 MHz PPDU, there may be three center 26-tone RUs, and a in a case of a 320 MHz PPDU, there may be four center 26-tone RUs.

According to an embodiment of the disclosure, in a case where a bandwidth is 20 MHz or 40 MHz, there may be no center 26-tone RU signaling.

According to an embodiment of the disclosure, when a bandwidth is 80 MHz, there may be center 26-tone RU signaling. Referring to FIG. 18, center 26-tone RU signaling may be performed by a center 26-tone RU subfield. According to an embodiment, when a value of the center 26-tone RU subfield is 1, it may mean that a user is allocated to the center 26-tone RU or a corresponding user field exists. In addition, when a value of the center 26-tone RU subfield is 0, it may mean that a user is not allocated to the center 26-tone RU and a corresponding user field does not exist. When a value of the center 26-tone RU subfield is 1, the corresponding user field may exist at the back of the same content channel. In this case, a CRC may be calculated to be included in the center 26-tone subfield.

Referring to part (a) of FIG. 18, center 26-tone RU subfields may exist in all content channels. In this case, the center 26-tone RUs may be signaled in any content channels, and free signaling can be performed. In this case, only in a content channel in which the center 26-tone RU subfield is configured as 1, a user field for the center 26-tone RU may exist. In another embodiment, center 26-tone RU subfields may exist in all content channels, and the values thereof may be identical. Accordingly, even though a receiver checks any content channels, the receiver can identify signaling for the center 26-tone RU.

Referring to part (b) of FIG. 18, only one center 26-tone RU subfield may exist in a pre-configured content channel. In this case, it may be advantageous that signaling overhead can be reduced more than the embodiment of part (a) of FIG. 18. A pre-configured content channel may be content channel 1. In addition, content channel 1 may be a content channel corresponding to a 20 MHz channel having the lowest frequency. Alternatively, content channel 1 may be a content channel corresponding to P20 channel. In addition, when a channel signaled by the pre-configured content channel is punctured, a center 26-tone RU subfield may exist in another content channel. For example, the location at which the center 26-tone RU subfield exists may be determined on the basis of puncturing information included in a U-SIG field. In addition, a user field corresponding to the center 26-tone RU may be signaled in a content channel in which the center 26-tone RU exists.

Figure 19:
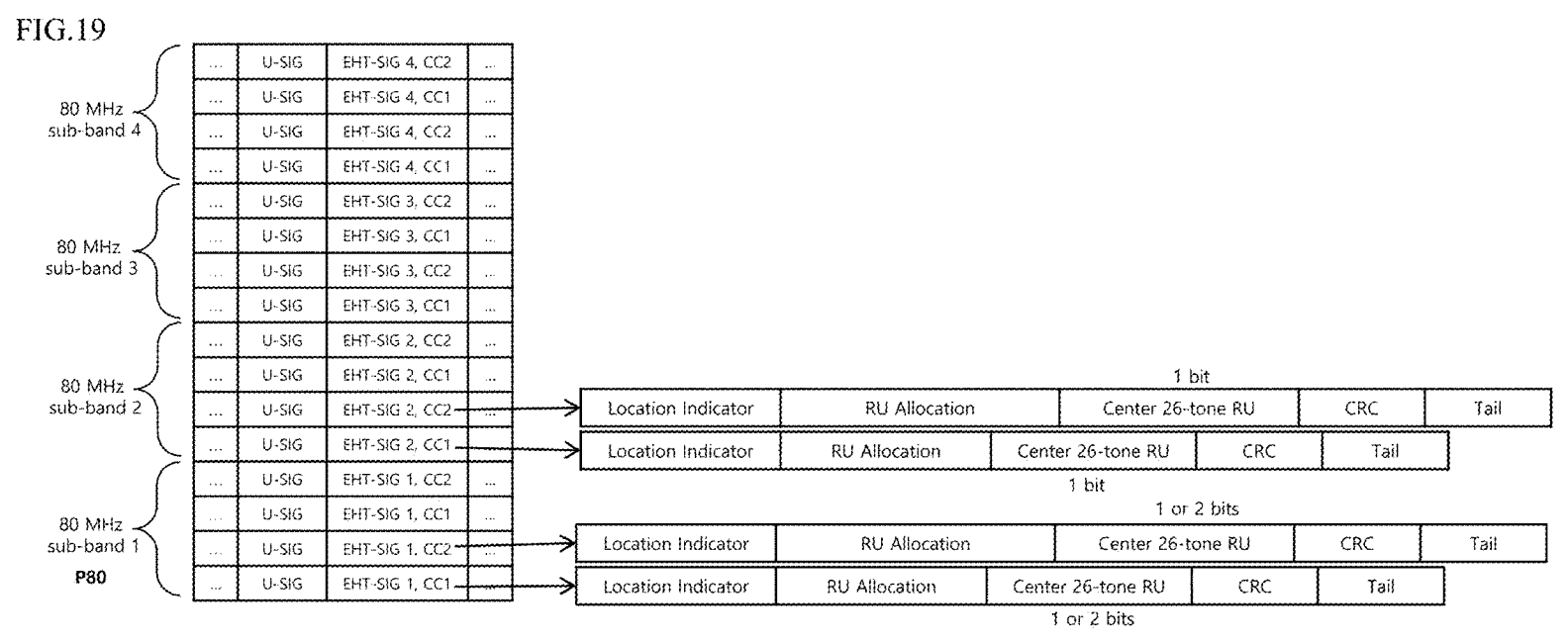

FIG. 19 illustrates another example of center 26-tone RU signaling according to an embodiment of the disclosure. In the embodiment of FIG. 19, the same contents as the contents described above may be omitted, and the above-described embodiments may be combined and used.

According to an embodiment of the disclosure, EHT-SIG signaling in a primary channel may be different from EHT-SIG signaling in a channel other than the primary channel. Alternatively, center 26-tone RU signaling in a primary channel may be different from center 26-tone RU singling in a channel other than the primary channel. Accordingly, the number (or the length) of center 26-tone RU subfields of a primary channel may be different from the number (or the length) of center 26-tone RU subfields in a channel other than the primary channel. The primary channel may mean a primary 80 MHz channel or a primary 160 MHz channel.

According to an embodiment of the disclosure, an EHT-SIG of a primary channel may include signaling for all center 26-tone RUs. For example, the EHT-SIG of a primary 80 MHz channel may include signaling for all center 26-tone RUs. That is, when a bandwidth is 160 (80+80) MHz, signaling for two center 26-tone RUs may be included in a primary channel, when a bandwidth is 320 (160+160) MHz, signaling for four center 26-tone RUs may be included in a primary channel, and when a bandwidth is 240 (80+160 or 160+80) MHz, signaling for three center 26-tone RUs may be included in a primary channel. In another embodiment, the primary channel may be a primary 160 MHz channel. By including signaling for all center 26-tone RUs in the primary channel, free signaling can be also performed in the primary channel. In addition, signaling for all center 26-tone RUs may be distributed to content channels. For example, with respect to signaling for two center 26-tone RUs existing in 160(80+80) MHz, signaling for one center 26-tone RU and signaling for one center 26-tone RU may in two content channels, respectively. In addition, with respect to signaling for four center 26-tone RUs existing in 320 (160+160) MHz, signaling for two center 26-tone RUs and signaling for two center 26-tone RUs may be included in two content channels, respectively. In addition, with respect to singling for three center 26-tone RUs existing in 240 (80+160 or 160+80) MHz, signaling for two center 26-tone RUs and singling for one center 26-tone RU (or signaling for one center 26-tone RU and signaling for two center 26-tone RUs) may be included in two content channels, respectively. Accordingly, in a case of 160 (80+80) MHz, each content channel may include a 1-bit center 26-tone RU subfield. In addition, in a case of 320 (160+160) MHz, each content channel may include a 2-bit center 26-tone RU subfield. In addition, in a case of 240 (80+160 or 160+80) MHz, two content channels may include a 2-bit center 26-tone RU subfield and a 1-bit center 26-tone RU subfield (or a 1-bit center 26-tone RU subfield and a 2-bit center 26-tone RU subfield), respectively.

Referring to FIG. 19, with respect a part indicated as "P80", each content channel includes a 1-bit or 2-bit center 26-tone RU subfield.

In another embodiment, to achieve free signaling, each content channel may include signaling for all center 26-tone RUs. Accordingly, when the bandwidth is 160 (80+80) MHz, each content channel may include signaling of a 2-bit center 26-RU subfield, when the bandwidth is 320 (160+160) MHz, each content channel may include signaling of a 4-bit center 26-RU subfield, and when the bandwidth is 240(80+160 or 160+80) MHz, each content channel may include signaling of a 3-bit center 26-RU subfield.

In addition, there may be a case where static puncturing is performed. The static puncturing may mean a case where a specific channel is punctured even though any PPDU is transmitted. In addition, the static puncturing may not be dynamic puncturing which is determined at each PPDU transmission. In addition, the static puncturing may have been determined in an association process. When the static puncturing is performed, a center 26-tone RU subfield for a center 26-tone RU included in or overlapping with a punctured channel of the static puncturing may be configured as 0. Alternatively, when the static puncturing is performed, there may be no center 26-tone RU subfield for a center 26-tone RU included in or overlapping with a punctured channel of the static puncturing. Accordingly, whether a center 26-tone RU subfield exists or the number of center 26-tone RU subfields may be determined on the basis of the static puncturing.

According to an embodiment of the disclosure, there may be an STA transmitting or receiving a PPDU in a channel other than a primary channel. This STA may be called an STA parked in a non-primary channel. By parking an STA in a non-primary channel, a situation where a primary channel is busy can be alleviated.

According to an embodiment of the disclosure, any RUs may be allocated to the STA parked in the non-primary channel. In this case, an EHT-SIG in the non-primary channel may include signaling for all center 26-tone RUs. Accordingly, an EHT-SIG in the primary channel may have the same structure as an EHT-SIG in the non-primary channel, and the center 26-tone RU signaling in the primary channel, described above, is applicable to a channel other than the primary channel.

According to another embodiment of the disclosure, a channel which can be allocated to the STA parked in the non-primary channel may be limited to 80 MHz. For example, a channel to which an EHT-SIG field of a predetermined channel can be allocated may be limited to 80 MHz including the predetermined channel. Referring to FIG. 19, the range in which the EHT-SIG of each 80 MHZ sub-band can be signaled may be limited to the corresponding 80 MHz sub-band. In this case, in an 80 MHz sub-band other than the primary 80 MHz channel, one center 26-tone RU may exist. Accordingly, the center 26-tone RU signaling method described in FIG. 18 is applicable to a channel other than the primary 80 MHz channel. Referring to FIG. 19, the center 26-tone RU signaling method as described in part (a) of FIG. 18 is applicable to a channel other than the primary 80 MHz. Accordingly, when a PPDU bandwidth is 160, 320, or 240 MHz, the number of center 26-tone RU signaled in 80 MHz sub-band 2 is all one, and FIG. 19 illustrates an example of center 26-tone RU signaling in all content channels.

According to another embodiment of the disclosure, a channel which can be allocated to an STA parked to a non-primary channel may be limited to 160 MHz. For example, a channel to which an EHT-SIG field can be allocated of a predetermined channel may be limited to 160 MHz including the predetermined channel. Referring to FIG. 19, the range which the EHT-SIG of each 80 MHz sub-band can be signaled may be limited to a P160 channel or an S160 channel including the corresponding 80 MHz sub-band. In this case, the number of center 26-tone RUs signaled in the 80 MHz sub-band other than the primary 80 MHz channel may be two. Accordingly, when two center 26-tone RUs can be all signaled in all content channels, each content channel may include a 2-bit center 26-tone RU subfield. Alternatively, signaling for two center 26-tone RUs is divided into content channels and performed, each content channel may include a 1-bit center 26-tone RU. The EHT-SIG corresponding to 80 MHz sub-band 2 in FIG. 19 indicates the case described above.

In a case where the bandwidth is 240 MHz, when two 80 MHz channels, which are non-P80 channel 1 and non-P80 channel 2, remaining after excluding the primary 80 MHz channel are indicated, in non-P80 channel 1, two center 26-tone RUs may be signaled as describe above, and in non-P80 channel 2, the same center 26-tone RU as in the case above where the allocatable channel is limited to 80 MHz may be signaled.

Figure 20:
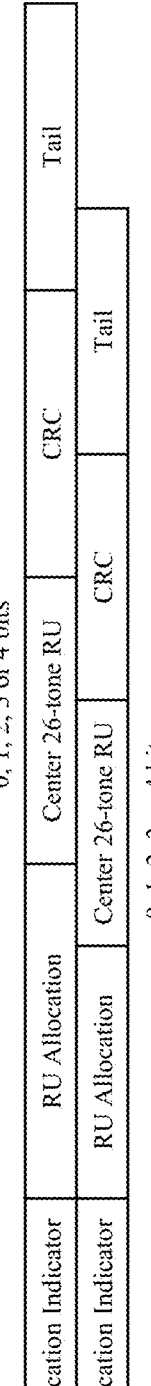
FIG. 20 illustrates another example of center 26-tone RU signaling according to an embodiment of the disclosure.

FIG. 20 illustrates another example of center 26-tone RU signaling according to an embodiment of the disclosure. In an embodiment of FIG. 20, the same contents as the contents described above may be omitted, and the above-described embodiments may be combined and used.

According to an embodiment, an EHT-SGI signaled in any channel may signal all center 26-tone RUs. Accordingly, the lengths (or the number) of center 26-tone RU subfields may be determined on the basis of a bandwidth. When a bandwidth is lower than 80 MHz, there may be no center 26-tone RU subfield.

In addition, when the bandwidths are 80, 160 (80+80), 240 (80+160 or 160+80), 320 (160+160) MHz, the center 26-tone RU subfields may be 1, 2, 3, and 4 bits, respectively. According to an embodiment, when there are multiple bits of the center 26-tone RU subfields, the bits may be mapped to center 26-tone RUs, respectively, in ascending order of the frequency.

The center 26-tone RU subfield described in FIGS. 18 to 20 may be used for CRC calculation together with the RU allocation subfield. Alternatively, the center 26-tone RU subfield described in FIGS. 18 to 20 may be used for CRC calculation together with the location indicator subfield and the RU allocation subfield. Alternatively, the center 26-tone RU subfield may not exist as an independent subfield, but some bits of the location indicator subfield may perform the role of the center 26-tone RU subfield. That is, some bits of the location indicator subfield may perform center 26-tone RU signaling.

FIG. 21 illustrates another example of an EHT-SIG structure according to an embodiment of the disclosure.

According to an embodiment of the disclosure, an EHT-SIG field may include a dummy RU allocation subfield. The dummy RU allocation subfield may be the dummy RU allocation subfield or the dummy data described in the embodiments above. In addition, the dummy RU allocation subfield may mean one entry among values of the RU allocation subfield. That is, an RU allocation subfield configured as a specific value may be referred to as a dummy RU allocation subfield.

In addition, the length (the number of bits) of the dummy RU allocation subfield may be identical to the length (the number of bits) of the RU allocation subfield. In addition, multiple dummy RU allocation subfields may exist in one content channel.

According to an embodiment of the disclosure, a location indicator subfield may indicate the existence of a dummy RU allocation subfield. For example, the location indicator subfield may indicate the dummy RU allocation subfield in the same manner the location indicator subfield indicates an RU allocation subfield. That is, when a bit of the location indicator subfield is 1, it may indicate the RU allocation subfield or a dummy RU allocation subfield. In addition, bits having a location indicator subfield value of 1 may be sequentially mapped to the subsequent RU allocation subfield or the dummy RU allocation subfield. Accordingly, the number of bits having the location indicator subfield value of 1 may be equal to a sum of the number of RU allocation subfields and the number of dummy RU allocation subfields. In addition, the dummy RU allocation subfield may exist in any locations, compared to the RU allocation subfield.

FIG. 21 illustrates a structure of a common field of an EHT-SIG field. Referring to FIG. 21, the EHT-SIG field may include a location indicator subfield, an RU allocation subfield, a dummy RU allocation subfield, a center 26-tone RU subfield, a CRC, and a tail. In this case, as described in FIGS. 14 to 16, multiple RU allocation subfields may be included.

In FIG. 21, multiple RU allocation subfields are illustrated as one RU allocation subfield. In addition, the dummy RU allocation subfield is illustrated as a hatched area. Referring to FIG. 21, the dummy RU allocation subfield may exist in content channel 1. In addition, the location indicator subfield may indicate the existence and the location of the dummy RU allocation subfield. FIG. 21 illustrates an embodiment in which the dummy RU allocation subfield precedes the RU allocation subfield.

According to an embodiment, the dummy RU allocation subfield may not indicate RU configuration or allocation. In addition, the dummy RU allocation subfield is not related to the number of tones and/or a bandwidth, and may indicate that there is no corresponding user or there is no allocated RU. Accordingly, there may be not user field corresponding to the dummy RU allocation subfield.

Accordingly, when a receiver interprets an EHT-SIG, bits of the dummy RU allocation subfield and the location indicator subfield corresponding to the dummy RU allocation subfield may be ignored. For example, when the location indicator subfield is configured as 11001000 (B0B1 . . . B7), a total of three subfields including the RU allocation subfield and the dummy RU allocation subfields may be followed. If RU allocation subfield 1, a dummy RU allocation subfield, and RU allocation subfield 2 are sequentially followed, RU allocation subfield 1 may correspond to B0, the dummy RU allocation subfield may correspond to B1, and RU allocation subfield 2 may correspond to B4. Accordingly, RU allocation subfield 2 may be RU allocation information for a frequency location corresponding to B4. In addition, in case of a user field, user fields corresponding to RU allocation subfield 1 may be followed by user fields corresponding to RU allocation subfield 2. There may be no user field corresponding to the dummy RU allocation subfield.

In another embodiment, when location indicator subfields exist in multiple content channels, the existence of the dummy RU allocation subfield and the number of dummy RU allocation subfields may be determined on the basis the number of RU allocation subfields, indicated by the location indicator subfield of each content channel. For example, when there are N1 corresponding to the number of RU allocation subfields, indicated by a location indicator subfield existing in content channel 1, N2 corresponding to the number of RU allocation subfields, indicated by a location indicator subfield existing in content channel 2, . . . , and Nn corresponding to the number of RU allocation subfields, indicated by a location indicator subfield existing in content channel n, the existence of a dummy RU allocation and the number of dummy RU allocations may be determined on the basis of N1, N2, . . . , and Nn. More specifically, the existence of a dummy RU allocation subfield and the number of dummy RU allocation subfields may be determined on the basis of a maximum value among N1, N2, . . . , and Nn. For example, the number of RU allocation subfields in content channel m may be ((a maximum number among N1, N2, . . . , and Nn)–Nm). Accordingly, values of the number of RU allocation subfields and the number of dummy RU allocation subfields in each content channel may be uniform. For example, the location of the dummy RU allocation subfield may be pre-configured. For example, the dummy RU allocation subfield may be subsequent to the RU allocation subfield, and may precede the center 26-tone RU subfield.

By using the dummy RU allocation subfield, the length of a field can be adjusted in each channel. For example, the start and the end of the RU allocation subfields and the dummy RU allocation subfields may be adjusted so as to be identical in each channel. Referring to FIG. 21, the length of the RU allocation subfield in content channel 2 is longer than the length of the RU allocation subfield in content channel 1, but by including the dummy RU allocation subfield in content channel 1, a sum of the length of the dummy RU allocation subfield and the length of the RU allocation subfield in content channel 1 is equal to the length of the RU allocation subfield in content channel 2. Accordingly, implementation during EHT-SIG generation or decoding can be easier.

Figure 22:
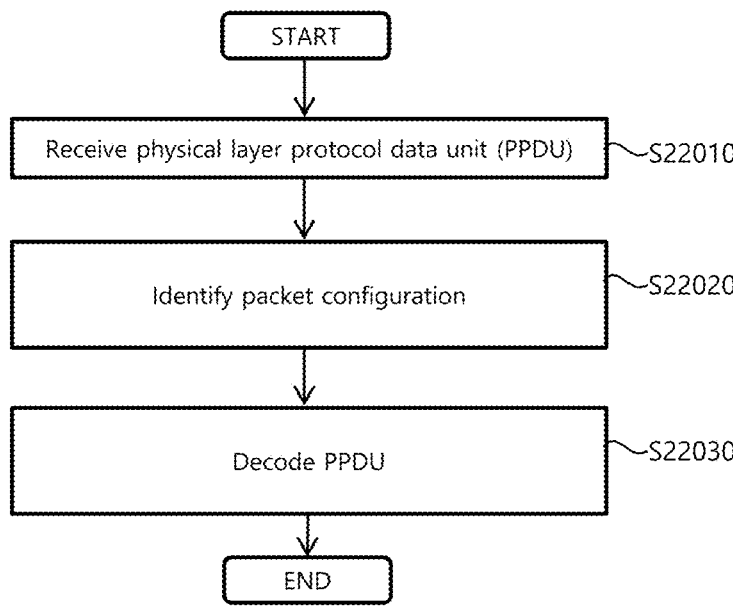
FIG. 22 is a flowchart illustrating an example of a PPDU reception and decoding method according to an embodiment of the disclosure.

FIG. 22 is a flowchart illustrating an example of a PPDU reception and decoding method according to an embodiment of the disclosure.

Referring to FIG. 22, a non-access point (AP) station (STA) may receive a preamble of a PPDU from an AP (S22010). The preamble of the PPDU may have the same structure as the structures described in FIGS. 14 to 16. For example, the PPDU may be an EHT PPDU, and the EHT PPDU may be an SU PPDU or an MU PPDU.

The preamble of the PPDU may include an EHT-SIG field including one or more EHT SIG content channels as described in FIG. 15, and each of the one or more EHT SIG content channels may include a common field and a user specific field.

The common field may include a specific field (for example, a location indicator field), at least one resource unit (RU) allocation subfield, a first CRC, and a first tail, and may further include at least one second resource unit allocation subfield, a second CRC, and a second tail according to a specific condition.

In this case, the specific field (for example, the location indicator subfield), the at least one first resource unit (RU) allocation field, the first CRC, and the first tail may constitute a first encoding block, and the at least one second resource unit allocation subfield, the second CRC, and the second tail may constitute a second encoding block.

In this case, as described above, the first encoding block may further include a spatial reuse subfield indicating whether spatial reuse is performed, a GI+LTF size subfield indicating a GI duration and EHT-LTF size, a number of EHT LTE symbols subfield indicating the number of EHT-LTF symbols, an LDPC extra symbol sequence subfield indicating whether there is a LDPC extra symbol sequence, a pre-FEC padding factor subfield indicating a pre-FEC padding factor, a PE disambiguity subfield indicating PE disambiguity, and the like.

In this case, as described above, the second encoding block may not be included according to a bandwidth of a PPDU, indicated by a bandwidth field of a U-SIG field.

Thereafter, the STA may identify a packet configuration of the received preamble (S22020). That is, the STA may identify a format of the received preamble of the PPDU.

For example, the STA may identify whether the common field further includes the at least one second RU allocation subfield. That is, the STA may identify whether the common field includes not only the first encoding block but also the second encoding block.

Specifically, the STA may identify whether the at least one second allocation subfield is included, on the basis of a specific field located before the at least one first RU allocation subfield. For example, the size and value of the location indicator subfield may be determined on the basis of the bandwidth of the PPDU, indicated by the bandwidth field of the U-SIG field, and the number of first RU allocation subfield and the number of second RU allocation subfields may be identified on the basis of the location indicator subfield. Based on this, the STA may identify whether the second RU allocation subfield is included, and moreover, identify whether the second encoding block is included in the common field.

That is, whether the at least one second RU allocation subfield is included in the common field may be determined (or identified) according to the bandwidth indicated on the basis of the bandwidth field of the U-SIG.

In addition, as described above, with respect to the one or more EHT-SIG content channels, values of some fields of the common field may be identically configured, and the other fields may be individually configured to have different values.

For example, some or all bits of the specific field (for example, the location indicator subfield) may be configured with the same value between content channels. In this case, the field configured with the same value may be some bits of the location indicator subfield, the spatial reuse subfield, the GI+LTF size subfield, the number of EHT LTE symbols field, the LDPC extra symbol sequence subfield, the pre-FEC padding factor subfield, the PE disambiguity subfield, etc.

In addition, as described above, the respective encoding blocks may be individually encoded/decoded. That is, the at least one first RU allocation subfield and the at least one second RU allocation subfield may be individually encoded/decoded.

As described above, the STA having identified the packet configuration may perform decoding on the basis of the identified packet configuration (for example, whether the second encoding block and/or the at least one second RU allocation subfield is included) (S22030).

Thereafter, the STA may receive data of the PPDU on the basis of the decoded preamble. That is, the data of the PPDU may be received through an RU allocated by the preamble.

Figure 23:
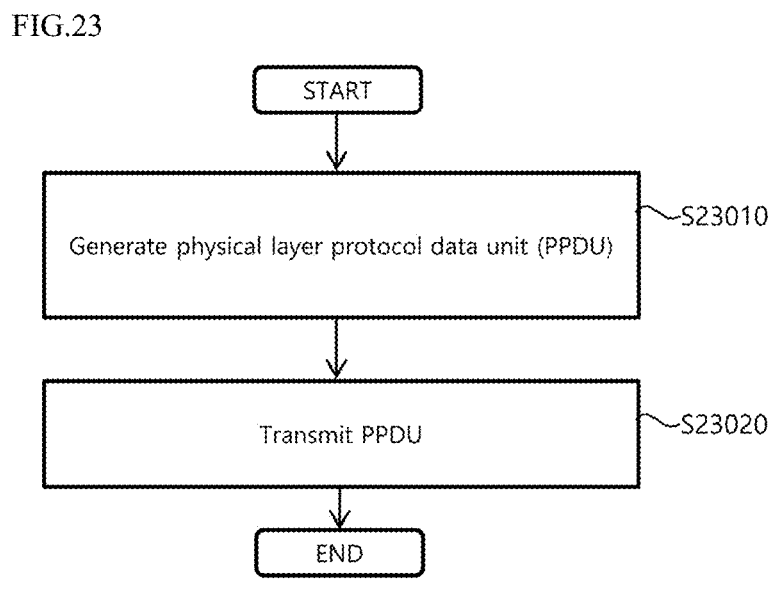

FIG. 23 is a flowchart illustrating an example of method for generating and transmitting a PPDU according to an embodiment of the disclosure.

Specifically, an AP may generate a PPDU to be transmitted to at least on STA (S23010). In this case, the PPDU may include a preamble and data.

The preamble of the PPDU may have the same structure as the structures described in FIGS. 14 to 16. For example, the PPDU may be an EHT PPDU, and the EHT PPDU may be an SU PPDU or an MU PPDU.

The preamble of the PPDU may include an EHT-SIG field including one or more EHT SIG content channels as described in FIG. 15, and each of the one or more EHT SIG content channels may include a common field and a user specific field.

The common field may include a specific field (for example, a location indicator field), at least one resource unit (RU) allocation subfield, a first CRC, and a first tail, and may further include at least one second resource unit allocation subfield, a second CRC, and a second tail according to a specific condition.

In this case, the specific field (for example, the location indicator subfield), the at least one first resource unit (RU) allocation field, the first CRC, and the first tail may constitute a first encoding block, and the at least one second resource unit allocation subfield, the second CRC, and the second tail may constitute a second encoding block.

In this case, as described above, the first encoding block may further include a spatial reuse subfield indicating whether spatial reuse is performed, a GI+LTF size subfield indicating a GI duration and EHT-LTF size, a number of EHT LTE symbols subfield indicating the number of EHT-LTF symbols, an LDPC extra symbol sequence subfield indicating whether there is a LDPC extra symbol sequence, a pre-FEC padding factor subfield indicating a pre-FEC padding factor, a PE disambiguity subfield indicating PE disambiguity, and the like.

In this case, as described above, the second encoding block may not be included according to a bandwidth of a PPDU, indicated by a bandwidth field of a U-SIG field.

Specifically, whether the at least one second allocation subfield is included may be identified on the basis of a specific field located before the at least one first RU allocation subfield. For example, the size and value of the location indicator subfield may be determined on the basis of the bandwidth of the PPDU, indicated by the bandwidth field of the U-SIG field, and the number of first RU allocation subfield and the number of second RU allocation subfields may be identified on the basis of the location indicator subfield. Accordingly, whether the second RU allocation subfield is included may be identified, and moreover, whether the second encoding block is included in the common field may be identified on the basis of the bandwidth of the PPDU.

That is, whether the at least one second RU allocation subfield is included in the common field may be determined (or identified) according to the bandwidth indicated on the basis of the bandwidth field of the U-SIG.

In addition, as described above, with respect to the one or more EHT-SIG content channels, values of some fields of the common field may be identically configured, and the other fields may be individually configured to have different values.

For example, some or all bits of the specific field (for example, the location indicator subfield) may be configured with the same value between content channels. In this case, the field configured with the same value may be some bits of the location indicator subfield, the spatial reuse subfield, the GI+LTF size subfield, the number of EHT LTE symbols field, the LDPC extra symbol sequence subfield, the pre-FEC padding factor subfield, the PE disambiguity subfield, etc.

In addition, as described above, the respective encoding blocks may be individually encoded/decoded. That is, the at least one first RU allocation subfield and the at least one second RU allocation subfield may be individually encoded/decoded.

Thereafter, the AP may transmit the generated PPDU to at least one STA through each RU (S23020).

The above-mentioned description of the disclosure is for illustrative purposes, and it will be understood that those who skilled in the art to which the disclosure belongs can easily modify the disclosure in other specific forms, without altering the technical ideas or essential characteristics of the disclosure. Therefore, the embodiments described above are illustrative and are not limited in all aspects. For example, each element described as a single entity may be distributed and implemented, and likewise, elements described as being distributed may also be implemented in a combined form.

The scope of the disclosure is defined by the appended claims rather than the above detailed description, and all changes or modifications derived from the meaning and range of the appended claims and equivalents thereof should be interpreted as being included within the scope of disclosure.

The invention claimed is:

1. A terminal in a wireless communication system, the terminal comprising:

a communication module; and a processor configured to control the communication module, wherein the processor is configured to:

receive an extremely high throughput physical layer protocol data unit (EHT PPDU) comprising one or more EHT-signal (SIG) content channels from an access point (AP), wherein each EHT-SIG content channel of the one or more EHT-SIG content channels includes a user specific field and a common field including at least one first resource unit (RU) allocation subfield, and wherein a specific field positioned before the at least one first RU allocation subfield is used to identify whether the common field includes at least one second RU allocation subfield after the at least one first RU allocation subfield, and decode the common field included in the EHT PPDU, wherein the common field includes i) a first coding block in which the at least one first RU allocation subfield is encoded and ii) a second coding block in which the at least one second RU allocation subfield is encoded when the common field further includes the at least one second RU allocation subfield, and wherein the specific field corresponding to each EHT-SIG content channel of two or more EHT-SIG content channels is set to a same value when the EHT PPDU includes the two or more EHT-SIG content channels.

2. The terminal of claim 1, wherein each of the first coding block and the second coding block separately decoded.

3. The terminal of claim 1, wherein the at least one first RU allocation subfield is encoded into the first coding block along with a first cyclic redundancy check (CRC) and a first tail, and wherein the at least one second RU allocation subfield is encoded into the second coding block along with a second CRC and a second tail.

4. The terminal of claim 1, wherein the specific field is related to a bandwidth over which the EHT PPDU is transmitted.

5. The terminal of claim 4, wherein the one or more EHT-SIG content channels are transmitted at each predetermined bandwidth according to the bandwidth.

6. The terminal of claim 1, wherein the specific field is used to identify a total number of each of the at least one first RU allocation subfield, whether the at least one second RU allocation subfield is included in the common field, and a number of the at least one second RU allocation subfield.

7. A method for receiving data by a terminal in a wireless communication system, the method comprising:

receiving an extremely high throughput physical layer protocol data unit (EHT PPDU) comprising one or more EHT-signal (SIG) content channels from an access point (AP), wherein each EHT-SIG content channel of the one or more EHT-SIG content channels includes a user specific field and a common field including at least one first resource unit (RU) allocation subfield, and wherein a specific field positioned before the at least one first RU allocation subfield is used to identify whether the common field includes at least one second RU allocation subfield after the at least one first RU allocation subfield; and decoding the common field included in the EHT PPDU, wherein the common field includes i) a first coding block in which the at least one first RU allocation subfield is encoded and ii) a second coding block in which the at least one second RU allocation subfield is encoded when the common field further includes the at least one second RU allocation subfield, and wherein the specific field corresponding to each EHT-SIG content channel of two or more EHT-SIG content channels is set to a same value when the EHT PPDU includes the two or more EHT-SIG content channels.

8. The method of claim 7, wherein each of the first coding block and the second coding block separately decoded.

9. The method of claim 7, wherein the at least one first RU allocation subfield is encoded into the first coding block along with a first cyclic redundancy check (CRC) and a first tail, and wherein the at least one second RU allocation subfield is encoded into the second coding block along with a second CRC and a second tail.

10. The method of claim 7, wherein the specific field is related to a bandwidth over which the EHT PPDU is transmitted.

11. The method of claim 10, wherein the one or more EHT-SIG content channels are transmitted at each predetermined bandwidth according to the bandwidth.

12. The method of claim 7, wherein the specific field is used to identify a number of the at least one first RU allocation subfield, whether the at least one second RU allocation subfield is included in the common field, and a number of the at least one second RU allocation subfield.

* * * * *